United States Patent
Arockia Dass et al.

(10) Patent No.: US 12,487,904 B2
(45) Date of Patent: Dec. 2, 2025

(54) SYSTEMS AND METHODS FOR INTEGRATING SCRIPT DEVELOPMENT AND SCRIPT VALIDATION PLATFORMS BASED ON DETECTED DEPENDENCY BRANCHES IN SCRIPT CODE

(71) Applicant: Citibank, N.A., New York, NY (US)

(72) Inventors: Joseph Julius Bosco Arockia Dass, New York, NY (US); Robin Jose Kurian, New York, NY (US); Laura McNeil, New York, NY (US); William Cameron, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/199,308

(22) Filed: May 5, 2025

(65) Prior Publication Data
US 2025/0265173 A1    Aug. 21, 2025

Related U.S. Application Data

(63) Continuation-in-part of application No. 18/818,072, filed on Aug. 28, 2024, which is a continuation of application No. 18/357,091, filed on Jul. 21, 2023, now Pat. No. 12,099,433, which is a continuation of application No. 18/180,208, filed on Mar. 8, 2023, now Pat. No. 11,709,757.

(51) Int. Cl.
*G06F 11/3604* (2025.01)
*G06F 11/3668* (2025.01)

(52) U.S. Cl.
CPC ...... *G06F 11/3604* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 9,946,632 B1* | 4/2018 | Chopra | G06F 11/3672 |
| 10,776,252 B1* | 9/2020 | Weiss | G06F 11/3698 |
| 12,298,889 B1* | 5/2025 | Toal | G06F 11/3688 |
| 2019/0012256 A1* | 1/2019 | Pöppe | G01R 31/2834 |
| 2022/0350731 A1* | 11/2022 | Ding | G06F 11/3684 |
| 2024/0220402 A1* | 7/2024 | Chen | G06F 11/3688 |

* cited by examiner

*Primary Examiner* — Andrew M. Lyons
(74) *Attorney, Agent, or Firm* — Foley & Lardner LLP

(57) ABSTRACT

Systems and methods are described that allow for updating of software applications during testing of the application to detect errors as a result of execution of portions of the software application that prevent downstream portions of the software application from being evaluated. In an example, systems are described that are configured to detect errors during application execution. When an error is detected, the system obtains and executes specific script sets to debug the application. Based on the results of these debug operations, the system generates error reports that indicate issues within the software workflow. This ensures that errors in one part of the software do not hinder the evaluation of subsequent parts, allowing for a more efficient and thorough testing process.

20 Claims, 10 Drawing Sheets

130

Summarized Testing Org View
(Click on the Manager/Domain Name to filter the other 2 Viz)

| Domain Name | Domain Leader Name | Manager Name | 2.HIGH | 3.MEDIUM | 4.LOW | Grand Total |
|---|---|---|---|---|---|---|
| | | Grand Total | 619 | 725 | 173 | 1,590 |
| Customer Management | Vazquez, Marjory | Reyes, Noel | 1 | | | 1 |
| | | Barringer, Alexis | 1 | 1 | | 2 |
| | | Cong, Songyuan | 7 | 1 | | 8 |
| Data Analytics | Granadas, Porcia | Kurian, Robin | 1 | 7 | | 8 |
| | | Redowm, Padma Priya | 67 | 110 | | 179 |
| | Kurian, Robin | Manian, Rajendran | 2 | 10 | 1 | 13 |
| Digital | Bose, Priyam | Tumakuntala, Ajay | 5 | 11 | 5 | 21 |
| | Logan, Kari | Sharma, Priyanka | 3 | 3 | | 6 |
| | Rao, Surya | Nagai Rajendran, Arjun | 2 | | | 2 |
| | | Bairispetly, Anusha | 1 | 4 | | 5 |
| | Srinivasan, Sangeetha | Kamebeina, Krishna | 20 | 26 | 9 | 55 |
| | | Thai, Lisa | 4 | | | 4 |
| | Veerasami, Anantha | Keene, Kelly | 11 | 5 | | 20 |
| | | | | | | 0 |

FIG. 1B

Calender Month KPIs

| | Goals | January | February | March |
|---|---|---|---|---|
| %Automated Executed | >=85 | 91.05% | 92.55% | 90.14% |
| %Automation Feasible | | 99.33% | 99.17% | 99.08% |
| Defect Reopen Rate | <=10 | 1.91% | 1.09% | 1.39% |
| Invalid Defect % | <=10 | 1.50% | 1.12% | 2.15% |
| Defect Turnaround Showstopper | <=3 | 9488 | 6924 | 7237 |
| Defect Turnaround High | <=5 | 9020 | 7161 | 8051 |
| Qa Hours Lost | | 3,502 | 4,563 | 4,628 |
| Defect Density | <=4 | 1.35% | 1.99% | 1.76% |

SYSTEMS AND METHODS FOR INTEGRATING SCRIPT DEVELOPMENT AND SCRIPT VALIDATION PLATFORMS BASED ON DETECTED DEPENDENCY BRANCHES IN SCRIPT CODE

CROSS-REFERENCE TO RELATED APPLICATION(S)

This application is a continuation in part of U.S. patent application Ser. No. 18/818,072, filed Aug. 28, 2024, which is a continuation of U.S. patent application Ser. No. 18/357,091, filed Jul. 21, 2023, which is a continuation of U.S. patent application Ser. No. 18/180,208, filed Mar. 8, 2023. The contents of the foregoing applications are incorporated herein in their entirety by reference.

BACKGROUND

Software programming typically involves multiple streams of code interacting with each other to perform different functions. These interactions may comprise instructions for actions to be performed, specific data sources to access, and/or particular conditions to be enforced. As such, even simple software applications comprise numerous code strings with numerous dependencies on other code strings to produce a given result for the application. Because each code string is dependent on the other, inefficiencies in one code string (or the combination of inefficiencies, lack of synergies, etc., in many code strings) may lead to low performance for the application. And these dependencies can also make it difficult to pinpoint errors during application testing or debugging, in some cases obfuscating the root cause of a given error.

SUMMARY

In some embodiments, systems and methods are described herein for novel uses and/or improvements to evaluation of applications, either during development or when implemented. For example, due to the complexity of coding, most coding operations for a given component of a larger application are siloed to users with a specific expertise in coding the relevant component. The process of identifying errors in the code (e.g., segmented in accordance with corresponding script sets), and notifying the appropriate individua(s) can be challenging due to the modular nature of modern software development. Each script set may be compiled independently, and errors that span multiple sets (e.g., memory access violations or logical inconsistencies) can be difficult to trace. While some debugging tools can aid in diagnosing issues by providing stack traces and memory inspection capabilities, their effectiveness depends on the inclusion of debugging symbols (e.g., breakpoints, etc.). Additionally, runtime errors, such as segmentation, can involve require specialized tools to detect memory-related issues that may not be evident during standard debugging processes. Regardless of the effectiveness of each of these tools, it can be difficult for appropriate individuals to receive notifications about various errors when such individuals are not directly assigned to corresponding software programming workflows for the code/script sets involved in the detected errors.

These technical challenges in debugging applications can be compounded by the increasing consumption of computational resources. As software grows in complexity, debugging can involve significant memory and processing power to simulate execution states across multiple segments. This can be particularly problematic in distributed systems where network communication can introduce latency and potential inconsistencies during debugging. Furthermore, iterative compilation cycles may be involved to resolve interconnected errors across script sets, leading to higher resource utilization. Logical errors that do not produce explicit runtime faults can also involve exhaustive analysis and repeated testing, further straining computing resources and delaying the amount of time involved in ultimately notifying the individual(s) who can resolve the errors/faults/etc.

By virtue of the implementation of the techniques described herein, the execution of debug operation sets, as described, can reduce computing processor and memory consumption through targeted analysis of discrete application functions. This can allow systems implementing these techniques to bypass redundant evaluations across non-critical code paths and focus on evaluations mapped to specific functional hierarchies for a software programming workflow. These systems can also minimize network communication overhead by executing focused debug operation sets (as opposed to an entire suite of debug operation sets) to obtain and analyze specific aspects of an application's operation. And accuracy improvements can be gained by virtue of the structured isolation of performance bottlenecks through hierarchical debugging methodologies that forgo evaluation of potentially irrelevant and/or unaffected script sets, reducing false positives in the root cause analysis process.

Further, systems that operate as described herein can proactively update the script sets being evaluated in response to the detection of errors to iteratively repair the script sets. This can reduce computing and memory resource consumption by automating the detection and resolution of errors in real-time and in accordance with a preestablished hierarchy. And by implementing machine learning-based techniques as described, systems can be configured to more quickly identify errors, and generate or otherwise obtain script sets, pseudocode scripts, etc., to mitigate or correct these errors (e.g., based on patterns according to which the machine learning models are configured to detect errors).

In some aspects, system sand methods for updating a software application during testing of the software application to detect errors as a result of execution of portions of the software application that prevent downstream portions of the software application from being evaluated are disclosed. In some examples, a system can be configured to obtain an indication that one or more errors occurred during execution of an application established by a plurality of script sets. The one or more errors can indicate unexpected operation of one or more portions of the application. In response to obtaining the indication, the system can obtain a first script set from among a plurality of script sets, where each script set of the plurality of script sets corresponds to a feature of the application. The system can then execute a first debug operation set, including one or more first debug operations, in accordance with the first script set to determine a first result. In response to determining the first result is associated with an indication of a second debug operation set, the system can execute the second debug operation set, comprising one or more second debug operations, in accordance with a second script set to determine a second result. The second result can indicate incorrect performance of a portion of the application. The system can then generate an error report based on the second result to indicate one or more aspects associated with a first portion or a second portion of a software programming workflow corresponding to the application. In some examples, the error report can indicate that the second portion of the software programming workflow cannot be evaluated based on errors associated with the first portion of the software programming workflow.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRA WINGS

FIGS. 1A-1C show an illustrative user interface for an integrated script development and script validation platform, in accordance with one or more embodiments.

DETAILED DESCRIPTION OF THE DRAWINGS

Figure 1A:
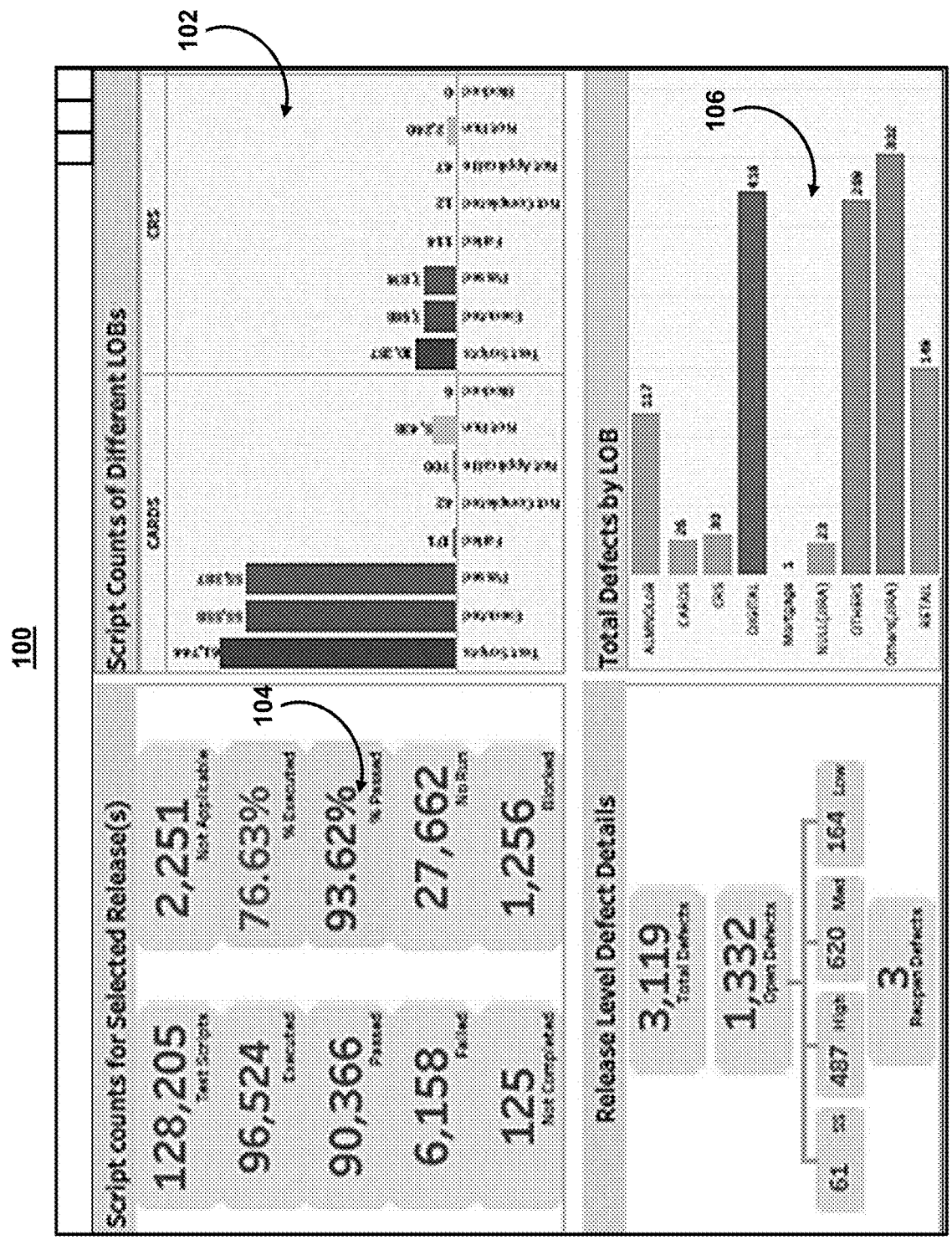

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

In some embodiments, systems and methods are described herein for novel uses and/or improvements to script development for software applications. For example, due to the complexity of coding, most coding operations for a given component of a larger application are siloed to users with a specific expertise in coding the relevant component. However, because each code string for each component is developed independently and/or may include operations that are unknown to the developers of other code strings, detecting inefficiencies in code strings and, in particular, detecting inefficiencies in the overall functioning of an application based on a combination of code strings is difficult.

In view of this difficulty, conventional systems rely on bifurcated development and validation platforms for software development. For example, a conventional system may provide a central repository for storing contributions of code strings for an application and a separate engine for validating and/or applying rules to the submitted contributions. The benefit of such an approach is that the separate engine may apply a common set of validation parameters and rules sets to all submitted contributions. While this bifurcated development approach ensures that all contributions have the validation parameters equally applied, it provides no mechanism for determining an overall effect of a code string on an application or how a given code string is intertwined with other code strings in the application.

In contrast to this bifurcated development approach, the systems and methods provide for an integrated script development and script validation platform. Notably, the integrated script development and script validation platform archives data in a novel way such that the dependencies between contributions of code strings (e.g., script sets) are detected and recorded. That is, the systems and methods detect dependency branches in the script code of script sets. By doing so, the systems and methods may identify individual performance characteristics for a given script set as well as determine the overall impact on the application itself.

Furthermore, upon detecting the dependencies of script sets, the system may determine particular script attributes (e.g., a particular data value, algorithm, function type, etc.) that may improve the performance characteristics of the script sets. That is, the system may generate optimizations for each of the scripts sets to optimize its performance. Additionally, as the manner in which each individual script set depends on other script sets for the functioning of the application is known, the system may optimize the script attributes for one or more script sets according to their effect on the application's performance.

For example, in view of the technical challenges described above, the systems and methods recite a specific platform architecture that allows the platform to accommodate complex algorithms, the use of specific data sets, individual techniques of preparing data, and/or training the script sets. For example, the script validation platform includes a workflow of script dependencies for script sets. The script validation platform may then iterate through the workflow of script dependencies along dependency branches that may be either automatically selected or selected based on user inputs. For example, the script validation platform may provide an initial assessment of an inputted script set's performance but also allow a user of the script validation platform to select one or more script set attributes (e.g., data preparation techniques, algorithms, validation metrics, etc.) for optimizing. Based on traversing the workflow of script dependencies, the system may accumulate enough information to provide native data (e.g., performance characteristics) for an initial first script set and a second recommended script set (e.g., predicted values, trends, graphs, plots, etc.) as well as assessment data that describes, in a human-readable format, a relationship between the native data for the first script set and the second script set (e.g., how the results of the first script set and second script set compare).

In some aspects, systems and methods for integrating script development and script validation platforms based on detected dependency branches in script code are described. For example, the system may receive, via a user interface, a user request to perform a script validation assessment on a first application using a script validation platform. The system may retrieve a first script set for the first application, wherein the first script set defines a first workflow of script dependencies for the first application. The system may retrieve a second script set that has been automatically generated by the script validation platform, wherein the second script set defines a second workflow of script dependencies for inserting at a dependency branch of the first workflow of script dependencies. The system may determine, based on the second script set, the dependency branch of the first workflow of script dependencies for automatically generating the script validation assessment. The system may generate the script validation assessment based on the first script set and the second script set, wherein the script validation assessment indicates a performance level of the first application using the second script set. The system may receive, via the user interface, a user selection of the script validation assessment. The system may, in response to the user selection of the script validation assessment, generate for display, on the user interface, native data, for the first script set and the second script set and assessment data that describes, in a human-readable format, a relationship between the native data for the first script set and the second script set.

FIG. 1A shows an illustrative user interface for an integrated script development and script validation platform, in accordance with one or more embodiments. For example, the system and methods described herein may generate for display, on a local display device, a user interface for a script validation platform. As referred to herein, a "user interface" may comprise a human-computer interaction and communication in a device and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but it can also be part of a live performance. Furthermore, user-generated content may include content created and/or consumed by a user. For example, user-generated content may include content created by another but consumed and/or published by the user.

User interface 100 may comprise a user interface for a script validation platform. In some embodiments, a script validation platform may include a script validation platform that integrates multiple other script validation platforms (e.g., a script set development control system). Through user interface 100, the script validation platform may receive a user request to access a script validation assessment (e.g., assessment 102) and/or perform one or more operations, such as selecting script sets for validation and/or applying parameters to the validation (e.g., setting independent variables, uploading script sets, and/or selecting output settings). The system may output an assessment that includes a plurality of information types, such as textual information (e.g., information 104), graphical information (e.g., information 106), and/or other information.

In some embodiments, user interface 100 may comprise an easily understandable dashboard to provide the entire happening of a script release. User interface 100 may also provide email snapshots of a home page, which may provide summarized info on script execution/Defects/Requirement traceability/Regression coverage as soon as the data is refreshed. A user interface may be available to users enabling them to have a holistic view of the status at a point in time, which is completely automated. User interface 100 may provide a plurality of icons, the selection of which takes users directly to the server, where the users are provided with multiple drill-down options in a seamless approach.

In some embodiments, user interface 100 may allow a user to select one or more script set attributes. Script set attributes may include any characteristic of a script set. These characteristics may comprise a type of data used, an algorithm used, data preparation and/or selection steps, and/or any other characteristic of one script set that distinguishes it from another. The system may also present information about the script development process, as shown in FIG. 1B. For example, the system may present information about users, roles, and/or progress indicators for script development, as shown in user interface 130.

As shown in FIG. 1B, user interface 130 allows for tracking and mitigating defects in pain points as a test manager (e.g., user) because it acts as a direct threat for sign-off and implementation of any release. For example, user interface 130 may provide a key functionality to filter the details of script production based on the selection of a domain or a manager making the view specific for their tracking, enabling them to track in an efficient way.

As shown in FIG. 1C, user interface 150 may generate for display data related to a script validation platform. For example, the system may store native data corresponding to fields of the script validation platform. The native data may include data related to one or more dependencies or dependency branches in a workflow of script dependencies that comprises a first script set of the script validation platform. For example, the first script set may comprise a series of steps that the script validation platform iterates through to test the validating of any inputted script set. The series of steps may include one or more dependencies (e.g., specific operations, functions, etc.) applied while testing an inputted script set. The first workflow may also have dependency branches. As the first script set iterates through its dependencies, it may determine to follow one dependency branch over another. For example, each dependency branch may correspond to a particular type of inputted script set, a particular script set attribute of an inputted script set, data inputs of an inputted script set, etc. The dependency branches for the workflow may be comprehensive for any type of inputted script set that is detected. For example, the dependency branches may have branches devoted to every type of script set. Then, for each script set attribute, data input, etc., the system iterates along specific branches (or sub-branches) corresponding to each script set attribute, data input, etc., corresponding to an inputted script set. Through this structure, the script validation platform may receive different types of script sets and provide validations therefor.

User interface 150 also includes native data (e.g., data 108) for a plurality of script sets. Native data or native data formats may comprise data that originates from and/or relates to a respective script set, the script validation platform, and/or their respective plugins. In some embodiments, native data may include data resulting from native code, which is code written specifically for a given script set, the script validation platform, and a respective plugin designed therefor. For example, as shown in user interface 150, the system may generate a graph, which may comprise native data. In some embodiments, native data for multiple script sets may be displayed simultaneously (e.g., in a side-by-side comparison).

For example, the system may generate a benchmark script set (or a benchmark rating, such as rating 110) based on the native code and/or dataset of one or more script sets. The system may then compare the benchmark script set to the one or more plurality of script sets. For example, the benchmark script set may comprise a script set generated by the system based on the native code and/or dataset of one or more script sets of the previously validated script sets. For example, the native code and/or dataset of one or more script sets may comprise the data set upon which the other script sets were trained, tested, and/or validated. For example, the benchmark script sets may also share one or more script set attributes with the one or more script sets of the previously validated script sets. However, the benchmark script set may also include different script set attributes. For example, the benchmark script set may include a script set attribute (e.g., a specific data preparation, algorithm, architecture, etc.) that differs from the one or more script sets of the previously validated script sets. Based on these differences, the benchmark script set may generate different results from the originally validated script set. These differences may then be compared using assessment data. For example, in some embodiments, assessment data may comprise quantitative or qualitative assessments of differences in data. As shown in user interface 150, this assessment data may comprise color coding (e.g., color coding 112), which represents a difference in the performance of script sets.

In some embodiments, native data may include source code for a script set. For example, in some embodiments, the system may allow a user to update and/or edit the source code for an inputted script set. For example, the system may receive a user modification to the source code for an inputted script set and then store the modification to the source code for an inputted script set. The system may then generate for display the inputted script set (or native data for the inputted script set) based on the modification to the source code. For example, the system may allow users having a given authorization to edit source code subject to that authorization. In such cases, the source code may have read/write privileges. Upon generating the source code for display, the system may verify that a current user has one or more read/write privileges. Upon verifying the level of privileges, the system may grant the user access to edit the source code.

User interface 150 may also include other assessment data. Assessment data may be presented in any format and/or representation of data that can be naturally read by humans. In some embodiments, the assessment data may appear as a graphical representation of data. For example, the assessment data may comprise a graph of the script validation assessment and/or a level of performance of a script set. In such cases, generating the graph may comprise determining a plurality of script validation assessments for different script sets and graphically representing a relationship of the plurality of script validation assessments. In some embodiments, the relationship of the native data to the script validation assessment may comprise a graphical display describing a hierarchal relationship of the first workflow of script dependencies and the second workflow of script dependencies. For example, the script validation platform may indicate differences and/or provide recommendations for adjustments to an inputted script set.

User interface 150 may correlate with all source systems, do all complex calculations, and automatically generate the native data and/or assessment data to be submitted to the managing director level in a single view for the entire year, along with threshold notations. User interface 150 may also provide additional drill-down functionality to check the performance of individual managers/teams.

Figure 2:
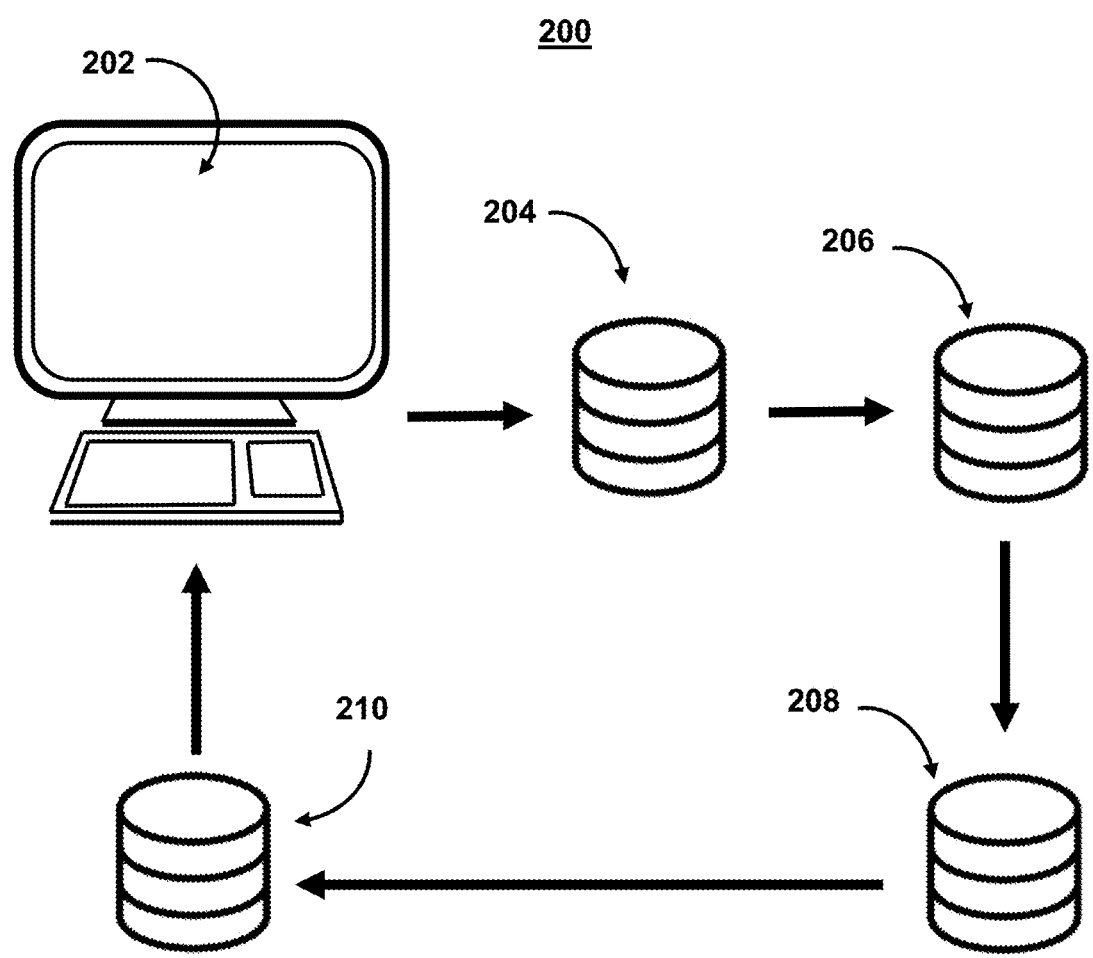
FIG. 2 shows an illustrative diagram of an architecture for an integrated script development and script validation platform, in accordance with one or more embodiments.

FIG. 2 shows an illustrative diagram of an architecture for an integrated script development and script validation platform, in accordance with one or more embodiments. For example, system 200 may provide a system for integrating script development and script validation platforms based on detected dependency branches in script code.

System 200 includes engine 202. Engine 202 may comprise an engine for a fully automated application with end-to-end script development capabilities that may require no manual intervention for tracking and monitoring the lifecycle of script testing. For example, engine 202 may provide testing from the creation of the test script to execution and the corresponding defect lifecycle in a systematic way (e.g., on a release level, month level, manager, organization, etc., on a single platform). Engine 202 assist management in addressing the issues for release management but also in tracking the capacity planning and productivity of the resources in the same space, which may help the entire management in the proper decision-making process by providing information for multiple process and various sources in one place and allow monitoring for the entire organization activity without leaving the platform. Engine 202 may also provide users with rich visuals, which not only provide the entire status on a snapshot but also assists in enabling swift decision-making. Engine 202 may also provide a user with the best option to drill down the data on multiple levels for a better understanding of the data and process.

Engine 202 may provide a reporting dashboard that transmits information (e.g., via an extension file, HTTPS protocol, and/or URL whitelist) to server 204. Server 204 and server 206 may comprise web components. Server 204 may transmit certificates from a certificate authority to server 206. Server 206 may then transmit information to server 208. Server 208 may use a SQL server to enable the transaction. Notably, this would not be present in a normal SQL server. Server 208 may generate a transaction replica, which is transmitted to server 210. Updates to server 210 may then be fed back to engine 202.

For example, transactional replication is a SQL Server technology that is used to replicate changes between two databases. These changes can include database objects like tables (primary key is required), stored procedures, views, and so on, as well as data. The system may use transaction replication to generate dashboard views (e.g., as described in FIGS. 1A-1C). Additionally, the use of transaction replication allows for underlying data (e.g., native data for one or more script sets) to be updated in real-time.

Figure 3A:
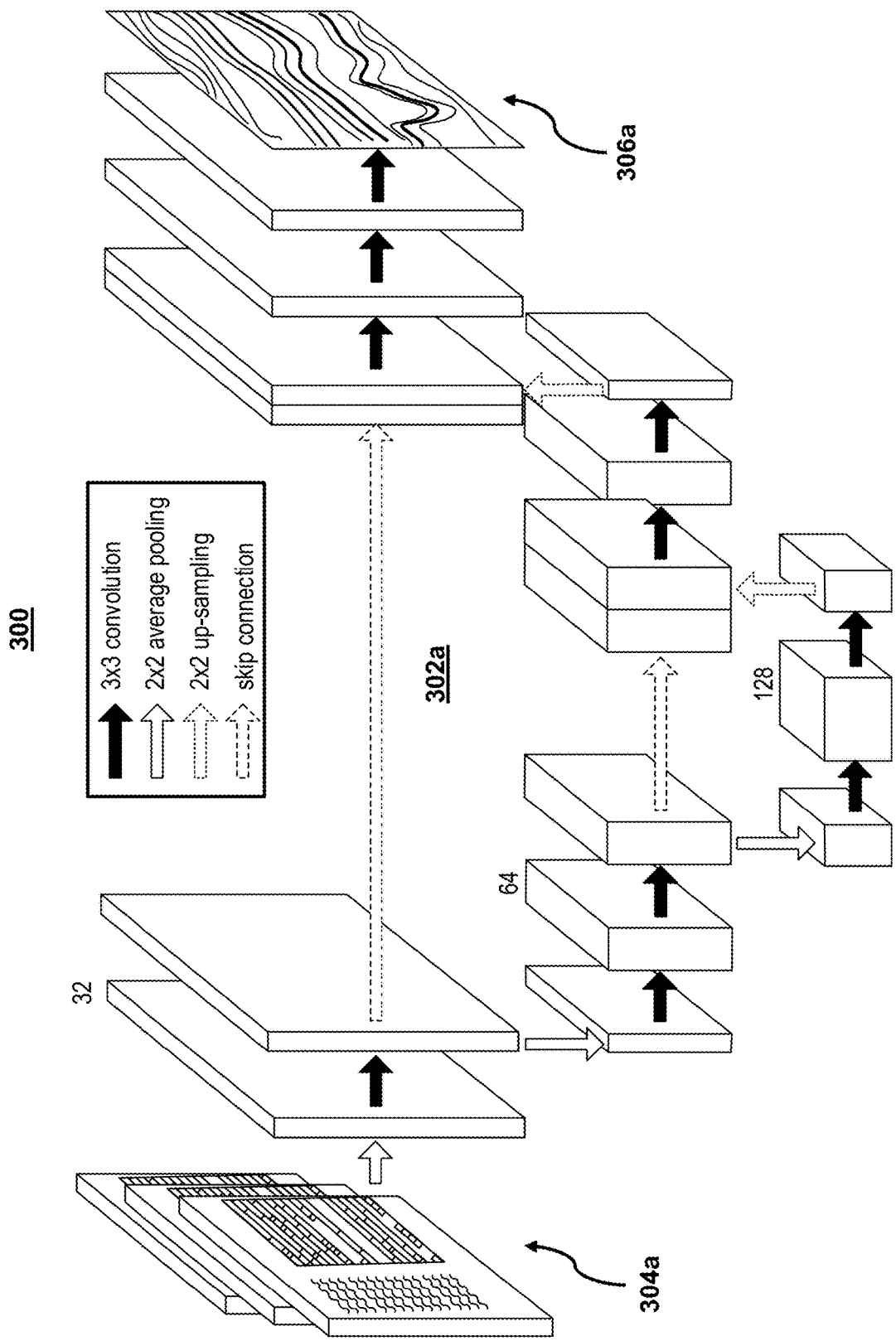
FIGS. 3A-3B show illustrative components for a system used to provide an integrated script development and script validation platform, in accordance with one or more embodiments.

FIG. 3A shows illustrative components for a system used to provide an integrated script development and script validation platform, in accordance with one or more embodiments. System 300 also includes model 302a, which may be a machine learning model, artificial intelligence model, etc. (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information).

For example, the system may receive a first labeled feature input, wherein the first labeled feature input is labeled with a known prediction for the first labeled feature input. The system may then train the first machine learning model to classify the first labeled feature input with the known prediction (e.g., a script set, script attribute, dependency branch for insertion, etc.). For example, the model may be trained on historic performance level data that is labeled with script attributes at different dependency branches that resulted in respective performance levels.

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 302a may be trained to generate better predictions.

In some embodiments, the model (e.g., model 302a) may automatically perform actions based on outputs 306a. In some embodiments, the model (e.g., model 302a) may not perform any actions. The output of the model (e.g., model 302a) may be used to predict a script set, script attribute, dependency branch for insertion, etc.

Figure 3B:
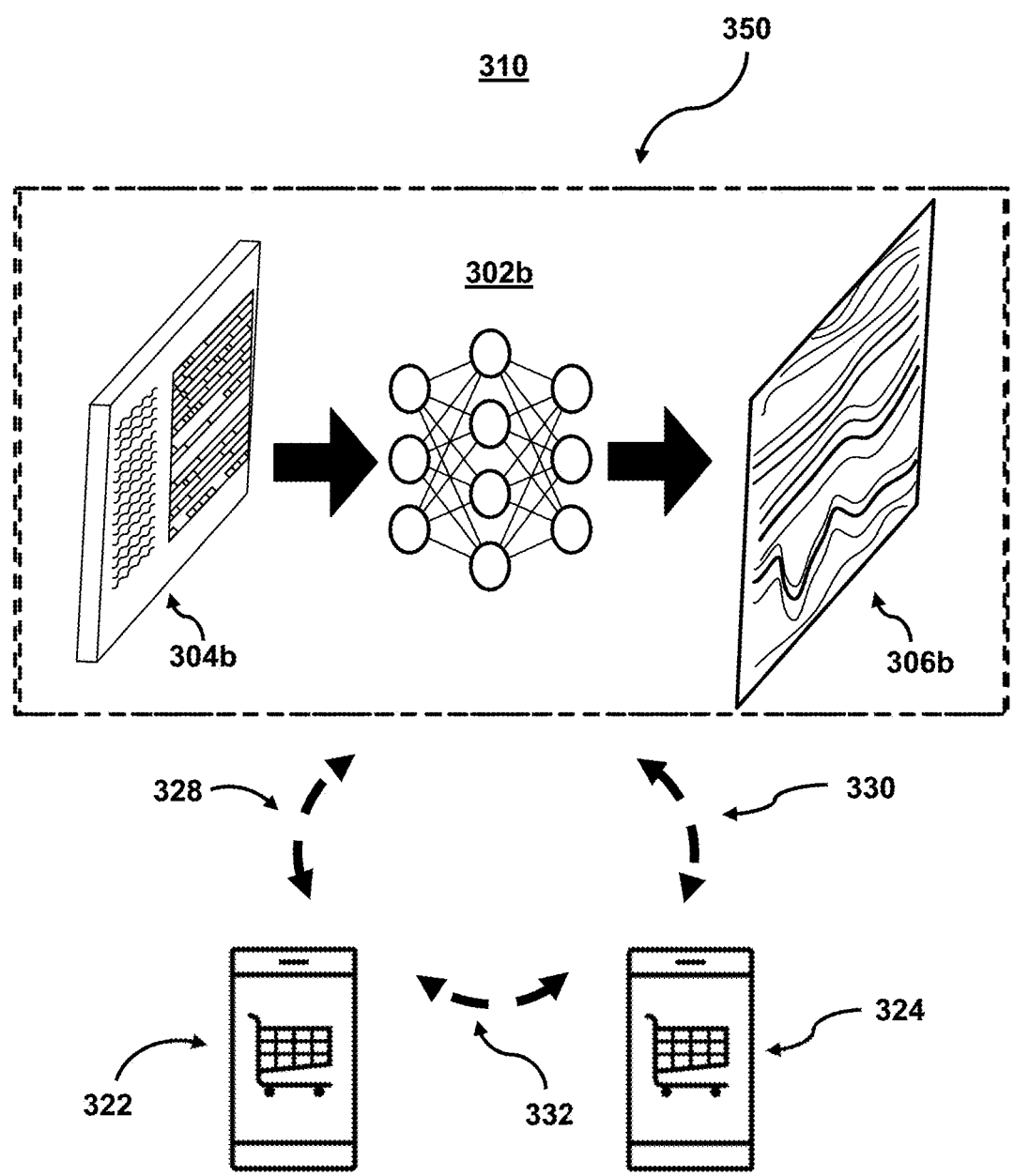

FIG. 3B shows illustrative components for an integrated script development and script validation platform. As shown in FIG. 3B, system 310 may include mobile device 322 and mobile device 324. While shown as a smartphone, respectively, in FIG. 3B, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 310 may also include cloud components. For example, cloud components may be implemented as a cloud computing system and may feature one or more component devices. It should be noted that while one or more operations are described herein as being performed by particular components of system 310, these operations may, in some embodiments, be performed by other components of system 310. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 310 and/or one or more components of system 310.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on mobile device 322 or mobile device 324. Alternatively, or additionally, API layer 350 may reside on one or more of cloud components. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is a strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302b may be trained by taking inputs 304b and providing outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem-solving, as compared to traditional computer programs. During training, an output layer of model 302b may correspond to a classification of model 302b, and an input known to correspond to that classification may be input into an input layer of model 302b during training. During testing, an input without a known classification may be input into the input layer, and a determined classification may be output. For example, the model may be trained on historic performance level data that is labeled with script attributes at different dependency branches that resulted in respective performance levels.

In some embodiments, model 302b may include multiple layers (e.g., where a signal path traverses from front layers to back layers). In some embodiments, backpropagation techniques may be utilized by model 302b, where forward stimulation is used to reset weights on the "front" neural units. In some embodiments, stimulation and inhibition for model 302b may be more free-flowing, with connections interacting in a more chaotic and complex fashion. During testing, an output layer of model 302b may indicate whether or not a given input corresponds to a classification of model 302b (e.g., a script set, script attribute, dependency branch for insertion, etc.).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also, as shown, model 302b may comprise fully connected layers that connect every neuron in one layer to every neuron in another layer.

Figure 3C:
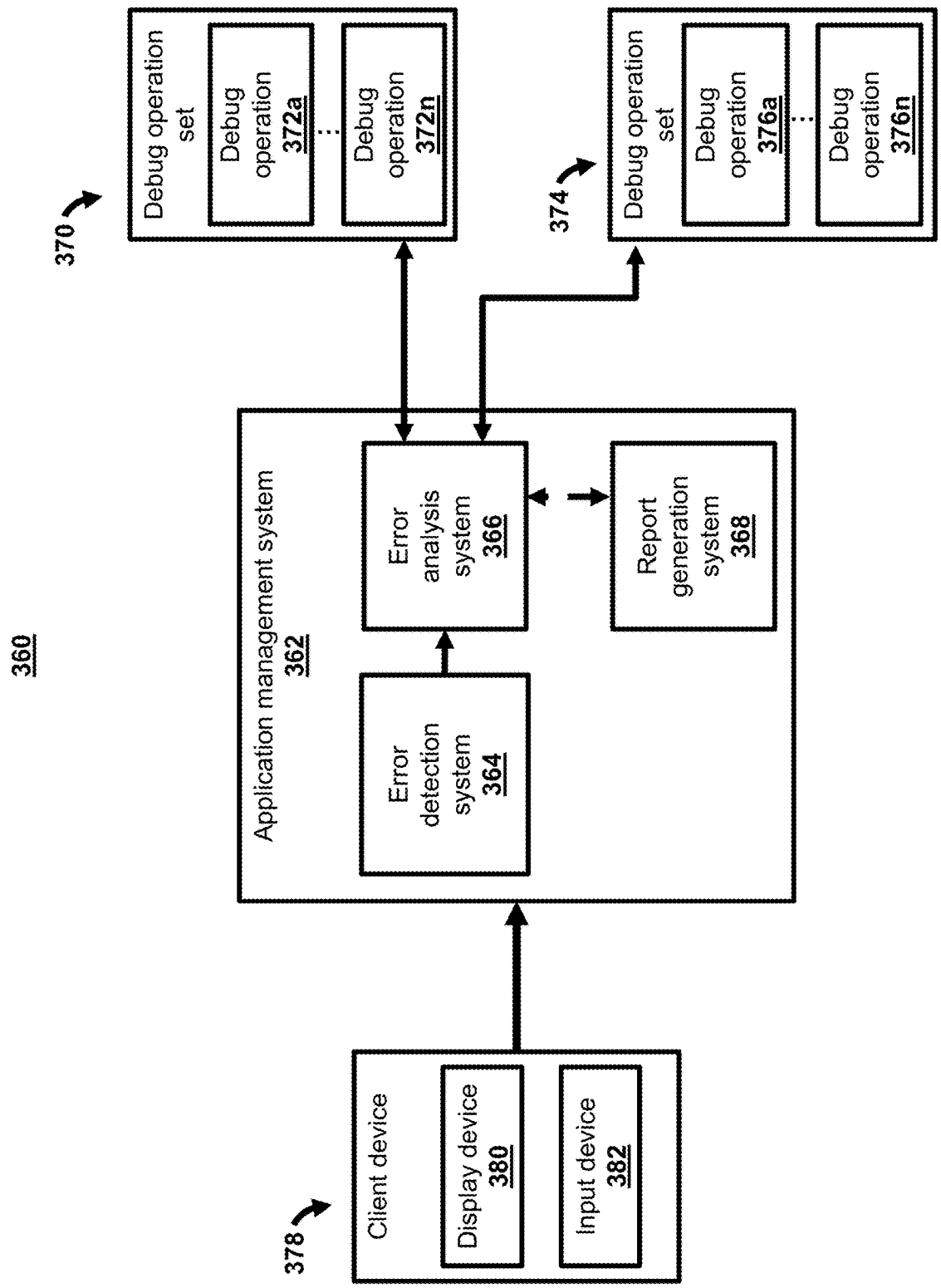
FIG. 3C shows an illustrative diagram of a system architecture for updating a software application to test the application, in accordance with one or more embodiments

FIG. 3C shows an illustrative diagram of a system architecture 360 for updating a software application to test the application, in accordance with one or more embodiments. For example, the system architecture 360 may be configured to detect errors, analyze aspects of the execution of script sets that may be involved in (e.g., the root cause of) the errors, and execute one or more operations to generate alerts or make updates to the execution of the script sets as described herein. In some examples described, the script sets may correspond to one or more applications executed by a single device or a group of devices in a distributed computing environment.

The system architecture 360 can include an application management system 362, a debug operation set 370, and a debug operation set 374, and a client device 378, each having, or otherwise being associated with, one or more components as described herein. The application management system 362, the debug operation set 370, the debug operation set 374, and the client device 378, including the components thereof, can be configured to interconnect using one or more wired and/or wireless communication connections. As will be understood, the system architecture 360, as illustrated, includes the application management system 362, the debug operation set 370, the debug operation set 374, and client device 378, but similar environments can include more devices that are the same as, or similar to, those described.

The application management system 362 can include a computing device that is configured to be in communication with the debug operation set 370, the debug operation set 374, and/or the client device 378 using one or more communication connections. For example, the application management system 362 can include a server, a desktop computer, a laptop computer, a smartphone, a tablet, and/or the like. In some embodiments, the application management system 362 can be involved in monitoring execution of one or more applications involving and/or monitored by users operating the client device 378. As described herein, the application management system 362 (e.g., one or more components of the application management system 362) can establish one or more secured or unsecured communication connections with the debug operation set 370, the debug operation set 374, and/or the client device 378. The application management system 362 can implement an error detection system 364, an error analysis system 366, and/or a report generation system 368.

The debug operation set 370 can include data that is maintained by a computing device configured to be in communication with (or included in) the application management system 362. For example, the debug operation set 370 can include data that is associated with one or more debug operations 372a-372n (referred to individually as debug operation 372 and collectively as debug operations 372, where contextually appropriate) maintained by a server, a desktop computer, a laptop computer, a smartphone, a tablet, and or the like. In some embodiments, the debug operation set 370 can be involved in (e.g., can direct) the execution of one or more operations by the application management system 362 to analyze one or more operations executed, in accordance with corresponding script sets, such as one or more functions associated with an application. As described herein, the debug operation set 370 can establish one or more secured or unsecured communication connections with the application management system 362.

The debug operation set 374 can include data that is maintained by a computing device configured to be in communication with (or included in) the application management system 362. For example, the debug operation set 374 can include data that is associated with one or more debug operations 376a-376n (referred to individually as debug operation 376 and collectively as debug operations 376, where contextually appropriate) maintained by a server, a desktop computer, a laptop computer, a smartphone, a tablet, and or the like. In some embodiments, the debug operation set 374 can be involved in (e.g., can direct) the execution of one or more operations by the application management system 362 to analyze one or more operations execute, in accordance with corresponding script sets, such as one or more functions associated with an application. As described herein, the debug operation set 374 can establish one or more secured or unsecured communication connections with the application management system 362.

The client device 378 can include a computing device that is configured to be in communication with the application management system 362, the debug operation set 370, and/or the debug operation set 374 using one or more communication connections. For example, the client device 378 can include a server, a desktop computer, a laptop computer, a smartphone, a tablet, and/or the like. In some embodiments, the client device 378 can be involved in monitoring execution of one or more applications involving and/or monitored by users operating the client device 378. In embodiments, the client device 378 can be involved in the implementation (e.g., execution) of the one or more applications. As described herein, the client device 378 (e.g., one or more components of the client device 378) can establish one or more secured or unsecured communication connections with the application management system 362. The client device 378 can include a display device 380 that is configured to display one or more user interfaces as described herein, and/or an input device 382 that is configured to receive input provided by an individual controlling the client device 378.

With continued reference to FIG. 3C, initially, an application having one or more script sets can be executed by a computing device, such as the client device 378 and/or one or more other computing device (not explicitly illustrated). For example, the client device 378 can load script sets associated with an application into memory of one or more computing devices described herein and cause the corresponding processor(s) to execute one or more operations based on (e.g., in accordance with) the script sets. In some examples, the script sets can be executed across multiple computing devices in distributed environments to implement functionality of the application across multiple computing devices, with nodes (e.g., servers, virtual machines) processing designated script subsets. In these examples, the application management system 362 can obtain data based on (e.g., representing) execution of the one or more script sets. For example, the application management system 362 can obtain performance characteristics (e.g., processing speed, error rates, etc.) that indicate a degree to which the script set is functioning as expected. In another example, the application management system 362 can obtain native data, which can include raw data inputs and outputs associated with execution of the script sets, as well as assessment data that describes the relationship between different script sets.

In some embodiments, the application management system 362 can obtain an indication that one or more errors occurred during execution of an application established by a plurality of script sets. For example, the application management system 362 can obtain the data associated with the execution of the one or more script sets, and can execute the error detection system 364 to determine whether one or more errors occurred during the execution of the application. In this example, the application management system 362 can cause the error detection system 364 to be executed based on a determination by a different device (e.g., the client device 378 or any other client device) that one or more errors occurred during execution of the application. In some examples, the error detection system 364 can determine that one or more errors occurred based on the outputs of the script sets obtained during execution of the application, based on one or more intermediate values generated by the script sets during execution of the application, based on one or more error messages generated by the script sets in response to the errors, etc.

In some examples, errors can include runtime errors (e.g., caused by invalid operations, such as dividing by zero, accessing a null object, or exceeding an array boundary), syntax errors (e.g., caused by grammatical or spelling mistakes in the underlying code of the script sets, such as missing a semicolon, using an undefined variable, or mismatching parentheses), logical errors (e.g., due to flaws in the logic or algorithm of an application and are usually caused by incorrect assumptions, wrong calculations, or faulty conditions), functionality errors (e.g., occurring when the application does not behave as intended, such as when a button is not clickable or a feature is hard, awkward, confusing, etc.), communication errors (e.g., when there is an error in the communication from the application to the end-user, such as missing help instructions or incorrect button labels, missing command errors (e.g., that occur when an expected command is missing, such as the absence of a "Cancel" button in a window), syntactic errors (e.g., where words are misspelled or grammatically incorrect sentences in the software's GUI), and so on.

In some embodiments, the application management system 362 can be configured to execute one or more operations in response to obtaining the indication that one or more errors occurred during execution of the application. For example, the application management system 362 can be configured to obtain data associated with one or more script sets (e.g., a first script set, a second script set, and so on) from among a plurality of script sets involved in the execution of the application. In this example, the first script set can correspond to a feature of the application. In some examples, the application management system 362 can obtain the data associated with the first script set based on one or more types of errors established by the indication provided to the application management system 362 of the one or more errors and/or determined by the error detection system 364. In another example, the application management system 362 can obtain the data associated with the first script set, where the first script set is identified as a default script set that is a starting point for evaluation when determining a root cause of the errors involved in the execution of the application during beta testing, runtime testing, etc.

In some examples, the application management system 362 can execute an error analysis system 366 in response to obtaining the indication of the error and determining that the error is to be processed using the error detection system 364. For example, the application management system 362 can execute the error analysis system 366, causing the error analysis system 366 to obtain data associated with a first debug operation set 370. This first debug operation set 370 can include one or more rules-based debug operations 372 that can be executed by the error analysis system 366, in accordance with the first script set. In some examples, debug operations can include, or be associated with, operations that involve stepping through portions of the underlying code corresponding to portions of the script sets, variable inspection (e.g., to check values for one or more variables at different points during execution of the application), logging information about execution of the application such as variable values (e.g., intermediate values/results or final values/results), etc.

In some embodiments, the error analysis system 366 can execute at least a portion of the first debug operation set 370, in accordance with the first script set to determine a first result. The first result can indicate one or more aspects regarding the execution of the script set such as, for example, one or more intermediate results generated during execution of the first script set, one or more outputs generated by the first script set, an indication of one or more downstream debug operation sets (e.g., a second debug operation set, a third debug operation set, etc.) to be used to evaluate performance of one or more different script sets, that are involved in the error(s), etc. In some embodiments, the error analysis system 366 can then provide the data generated to the report generation system 368 to process the data and generate one or more error reports as described herein. Additionally, or alternatively, the error analysis system 366 can generate and/or obtain the one or more error reports (or portions thereof) and provide them to an artificial neural network as described herein to update and/or continue evaluation of the script sets of the application.

In some embodiments, the error analysis system 366 can compare the one or more aspects regarding the execution of the first script set to one or more predetermined aspects (e.g., associated with expected operation of script sets) and, where the one or more aspects do not satisfy the one or more predetermined aspects, determine that an error occurred in association with a particular debug operation 372 from the first debug operation set 370. As one example, the error detection system 364 can obtain an intermediate value that should include a non-negative value based on execution of one or more debug operations 372. In this example, the error analysis system 366 can determine that the intermediate value does include a non-negative value, and the error detection system 364 can then determine that the particular debug operation 372 is associated with an error. In some examples, this error can be indicative of a root cause leading to operation of the application differently than intended (such as errors that indicate unexpected operation of one or more portions of the application, resulting in increased latency, crashes, etc.). In another example, the error analysis system 366 can determine that a format associated with an intermediate value, the first result, etc., generated during execution of the first debug operation set 370 is associated with a format of a certain type (e.g., that one or more values correspond to a given type such as an integer, floating point, etc.) and that the format does not match (e.g., is a mismatch) with an expected format for that intermediate value or first result. The error analysis system 366 can then determine one or more updates as described below based on the determination of this mismatch and update the first script set to address the mismatch. This process can be iteratively performed for each script set evaluated by the error analysis system 366.

In some examples, in response to generating an output when evaluating the first debug operation set 370, the error analysis system 366 can identify a second debug operation set 374 that is indicated by the output (such as the first result) of the first debug operation set 370. For example, the error analysis system 366 can execute the first debug operation set 370 in accordance with the first script set to determine the first result, where the first result includes an indication of the second debug operation set 374 in a hierarchy of debug operation sets to be executed when evaluating the performance of the application. This can be in the case where, for example, the debug operations 372 were successfully executed and no errors were identified. In this example, the error analysis system 366 can obtain data associated with the second debug operation set 374 and a second script set from among the plurality of script sets. The error analysis system 366 can then execute at least a portion of the second debug operation set 374 in accordance with the second script set. This can cause the error analysis system 366 to generate a second result that indicates information that is the same as, or similar to, the intermediate results described and/or the first result. While the present disclosure discusses a first debug operation set 370 and a second debug operation set 374 used to evaluate operation of a first script set and a second script set of an application, respectively, it will be understood that any number of debug operation sets and script sets may be implemented and evaluated by the error analysis system 366 in accordance with hierarchies established by each debug operation set. It will also be understood that an application management system 362 can implement one or more systems as described herein to iteratively and/or recursively evaluate script sets (e.g., by executing debug operation sets and corresponding debug operations in an order established by the hierarchies) executed in accordance with the application to identify a root cause as described herein.

The second result can indicate one or more aspects regarding the execution of the first script set and/or the second script set such as, for example, one or more intermediate results generated during execution of the first script set and/or second script set, one or more outputs generated by the script sets, an indication of one or more additional (e.g., third) debug operation sets to be used to evaluate performance of one or more of the script sets from the plurality of script sets, that are involved in the error(s), etc. In some embodiments, the error detection system 364 can again provide the data generated during execution of the script sets to the error analysis system 366 to process the data and generate one or more error reports, execute one or more operations to update the script sets to self-heal, etc., as described herein.

In some embodiments, the error analysis system 366 can determine the second result based on a first state (e.g., of an application) after execution the first debug operation set 370 in accordance with the first script set. For example, the error analysis system 366 can determine the second result based on execution of one or more debug operations 372 and/or one or more debug operations 376 (e.g., that depend on the outputs of the debug operations 372). In an example, the error analysis system 366 can execute the debug operations 372 in accordance with the first script set and determine that the first script set is incomplete. This determination can be made based on, for example, one or more intermediate results and/or final results generated in response to execution of the first script set that return values that are not compatible the second script set (e.g., null values, values that are outside of a range which the second script set is configured to process, etc.). In these examples, error analysis system 366 can then provide data indicating the result(s) of the execution of the debug operations 372 and or the debug operations 376 to the report generation system 368 to allow the report generation system 368 to aggregate the data and generate an error report.

In some embodiments, in response to determining that at least a portion of the first script set is not complete (e.g., is incomplete), the error analysis system 366 can execute a script validation assessment to identify one or more downstream scripts and/or script sets that are affected by the first state of the first script set. For example, the error analysis system 366 can analyze dependencies and interactions between various script sets within the application to pinpoint scripts that may exhibit issues or degraded performance due to the incomplete state of the first script set. Once these downstream scripts are identified, the error analysis system 366 can proceed to determine one or more pseudocode scripts that include logic (e.g., temporarily script sets, intermediate results, and/or combinations thereof) and intended functionality of the affected downstream scripts. These pseudocode scripts can serve as simplified representations that can be implemented to allow for evaluation of the downstream impacts of a given error.

In some embodiments, the error analysis system 366 can determine the second result based on the first state of the application after execution of the first script set in accordance with the first debug operation set 370. In some examples where the error analysis system 366 determines that the first script set is incomplete as described herein, the error analysis system 366 can analyze the dependencies between various script sets within the application. In these examples, the error analysis system 366 can determine that the first script set is incomplete and affecting downstream script sets (e.g., the second script set), and the error analysis system 366 can provide this information to the report generation system 368, to allow the information to be included in one or more error reports. Additionally, or alternatively, the error analysis system 366 can provide the error report as an input to an artificial neural network, which is configured to process the data and generates an output that includes an indication of one or more pseudocode scripts. These pseudocode scripts can be selected from a predetermined set of pseudocode scripts or can be generated by the error analysis system 366. In some embodiments, these pseudocode scripts can be configured to be implemented by the device(s) that are involved in the error that is the root cause of a set of errors, by downstream device(s) to at least temporarily address the impacts of the error, etc.

In some embodiments, the error analysis system 366 can be configured to select a pseudocode script from a plurality of pseudocode scripts (e.g., preexisting pseudocode scripts) by comparing a first aspect of the execution of the first debug operation set 370 in accordance with the first script set to one or more predetermined aspects associated with intermediate outputs that were previously identified as incompatible for the application involved or other applications analyzed by the application management system 362. For example, the error analysis system 366 can identify discrepancies between the expected and actual intermediate outputs generated during execution of the first debug operation set 370, such as mismatched data types or value ranges that are not supported by subsequent script sets. Upon determining at least a partial match between the first aspect and a predetermined aspect (e.g., earlier-identified mismatches in data types, value ranges, etc., by the application management system 362), the error analysis system 366 can reconfigure the script sets of the application being analyzed based on the identified predetermined aspect. This can involve pinpointing the root cause of the error and selecting appropriate pseudocode scripts (e.g., from a set of predetermined pseudocode scripts) that address the specific conditions leading to the incompatibility and result in at least a partial match between the aspects of the execution of the application and predetermined aspects of the earlier-evaluated application. In additional examples, the error analysis system 366 can be configured to obtain predetermined pseudocode scripts associated with a different portion of the software programming workflow than the one involved in the errors being addressed or associated with a different software programming workflow (e.g., a second software programming workflow). This can allow the error analysis system 366 to leverage solutions from other portions of the application to address the error(s) analyzed by the error analysis system 366. By obtaining and integrating these predetermined pseudocode scripts, the error analysis system 366 can extend its error mitigation strategies beyond the immediate context of the detected errors.

In some embodiments, the error analysis system 366 can update at least a portion of the first script set based on the predetermined pseudocode scripts. For example, the error analysis system 366 can replace existing script sets (or portions thereof) with the predetermined pseudocode scripts to align the application's logic and functionality with the intended behavior. In response to updating the first script set, the error analysis system 366 can update and reevaluate the application to confirm the updates to the first script set were successful in addressing the error(s) identified with the first script set.

In some examples, the error analysis system 366 can implement an artificial neural network as described above, using various types of model architectures, such as feedforward neural networks, recurrent neural networks (RNNs), convolutional neural networks (CNNs), transformers, etc. For example, the error analysis system 366 can implement an artificial neural network that is configured to receive as input error reports and/or any other data generated by the error analysis system 366 as described herein that indicate aspects regarding the nature and context of the errors encountered in the script sets (including the root cause of the errors). These error reports and/or data can contain information such as error codes, error messages, stack traces, and metadata about the environment in which the errors occurred. The artificial neural network can then process these inputs to identify patterns and correlations that point to the underlying issues. The output generated by the artificial neural network can include pseudocode scripts that provide temporary solutions to mitigate the identified errors when testing the plurality of script sets. These pseudocode scripts can be configured to address specific error conditions and can be implemented directly into the affected script sets to resolve the issues.

In some embodiments, the artificial neural network can be trained (e.g., by the application management system 362) by providing entries in a dataset of error reports as inputs to the artificial neural network. During training, the weights of the artificial neural network can be adjusted through backpropagation, a process where the outputs of the artificial neural network are compared to predetermined pseudocode scripts (preestablished for each corresponding entry), and the errors can be propagated back through the artificial neural network to update the weights of the artificial neural network. This iterative process can allow for the configuration of the artificial neural network to generate pseudocode scripts based on the input error reports. The training dataset can be continuously updated with new error reports and/or data generated by the error analysis system 366 and solutions to improve the performance of the artificial neural network over time.

In response to obtaining the output of the artificial neural network, the error analysis system 366 can determine one or more locations associated with the one or more pseudocode scripts. This can involve the error analysis system 366 pinpointing specific segments within the existing script sets to be modified (e.g., replaced or be configured to be executed based on the pseudocode scripts) in accordance with the one or more pseudocode scripts to address the identified errors. In some embodiments, the error analysis system 366 can then reconfigure the script sets of the application by integrating these pseudocode scripts, thereby addressing the errors and allowing the application to perform as intended.

In some embodiments, the error analysis system 366 can be configured to obtain outputs generated by the artificial neural network as described above (referred to here for context as the first artificial neural network) and, upon receiving these outputs, obtain one or more script outlines for pseudocode scripts. These script outlines can be selected based on the output of the first artificial neural network. The error analysis system 366 can then generate the corresponding pseudocode scripts based on the script outlines. In some embodiments, the error analysis system 366 can synthesize these pseudocode scripts to address specific error conditions. In some embodiments, the error analysis system 366 can reconfigure the application (e.g., at least some of the plurality of script sets implementing the application). This can involve modifying the plurality of script sets to incorporate the newly generated pseudocode scripts to (at least temporarily) address the root cause of the errors.

In some embodiments, the error analysis system 366 can implement a second artificial neural network that is similar to the first artificial neural network. For example, the error analysis system 366 can implement a second artificial neural network that is configured to receive script outlines and generate pseudocode scripts. In this example, the second artificial neural network can be implemented as a sequence-to-sequence model, where the input sequence consists of script outlines detailing the logic and flow of the desired pseudocode. The error analysis system 366 can implement the second artificial neural network processes these script outlines, identifying key components such as conditional statements, loops, and function calls. The second artificial neural network can then map these components to corresponding pseudocode constructs, and confirm that the generated pseudocode scripts are compatible with the specified logic and structure of the script outlines. In some embodiments, the output of the second artificial neural network can include a set of pseudocode scripts that can be implemented by the error analysis system 366 to address the root causes of errors.

In some embodiments, as the error analysis system 366 identifies errors within the script sets of an application, the error analysis system 366 can generate pseudocode scripts iteratively to mitigate these errors, as described above. For example, the error analysis system 366 can execute a first debug operation set 370 to determine the initial state and identify any incomplete script sets. Using the results of the first debug operation set 370, the error analysis system 366 can identify downstream scripts affected by the errors (based on the dependencies established by the plurality of script sets) and generate pseudocode scripts to temporarily mitigate these errors and allow for continued evaluation of the plurality of script sets. Continual identification and analysis of subsequent errors can allow for recursive generation of these pseudocode scripts. In some embodiments, the error analysis system 366 can, similarly, perform iterative updates to the plurality of script sets based on the pseudocode scripts as the error analysis system 366 analyzes downstream script sets.

In some embodiments, the error analysis system 366 can update the application by integrating the indicated pseudocode scripts into the existing script sets. Based on implementing these pseudocode scripts, the error analysis system 366 can update the first debug operation set 370 or the second debug operation set 374 accordingly, and confirm that these scripts align with the new configurations and logic. This iterative updating allows the error analysis system 366 to evaluate the performance of the application comprehensively, scrutinizing the effects of the implemented pseudocode scripts on overall efficiency, error mitigation, and system stability.

In some embodiments, the error analysis system 366 can evaluate the performance of the application by integrating the indicated pseudocode scripts into the existing script sets and observing the effects on the application's functionality. For example, the error analysis system 366 can compare the performance of the script sets (e.g., aspects regarding the latencies involved in executing the script sets, whether one or more errors persisted despite the updates to the script sets, etc.) before and after the updates to determine whether the implemented pseudocode scripts effectively address the errors and enhance the application's efficiency. If the performance is not improved by a threshold amount and/or to a threshold degree, the error analysis system 366 can continue to evaluate the application by identifying further errors (if they exist), generating additional pseudocode scripts, and iteratively updating the script sets. This recursive process can allow the error analysis system 366 to continuously evaluate the application, pinpointing and mitigating errors until the desired performance improvements are achieved.

In an example, the error detection system 364 can generate an error report. For example, the application management system 362 can cause the report generation system 368 to generate the error report based on the execution of one or more operations by the error detection system 364 and/or the error analysis system 366 period. In this example, the application management system 362 can cause the report generation system 368 to generate the error report based on at least the first result (e.g., one or more aspects of the first result), the second result (e.g., one or more aspects of the second result), and/or combinations thereof.

In some embodiments, the error report can include information about one or more aspects regarding the execution of the application that are associated with (e.g., correspond to) a first portion or a second portion of a software programming workflow. For example, the error report can include information about one or more aspects of a first portion of a software programming workflow, such as one or more operations implemented by script sets that are configured in accordance with the first portion of the software programming workflow, one or more inputs that the first portion of the software programming workflow configures the first portion of the application to receive, one or more outputs that the first portion of the software programming workflow configures the first portion of the application to generate, etc. Additionally, or alternatively, the error report can indicate one or more client devices, such as the client device 378, that are assigned to one or more software developers involved in programming the first script set that corresponds to the first portion of the software programming workflow. Similarly, the error report can include information about one or more aspects of a second portion of the software programming workflow. This can include information about one or more operations configured to be executed in accordance with the second portion of the software programming workflow, one or more inputs that the second portion of the script sets corresponding to the software programming workflow are configured to execute, one or more outputs that the first portion of the software programming workflow is configured to generate, etc.

In some embodiments, the error analysis system 366 can be configured to reconfigure the application based on an error report by executing a series of debug operation sets as described herein and reconfiguring the script sets of the application to mitigate or resolve the error(s) identified. In response to reconfiguring the application, the error analysis system 366 can execute the first debug operation set 370 comprising one or more debug operations in accordance with the first script set to determine a first update to the first result. Similarly, in response to determining that the first update is associated with the indication of a second debug operation set 374, the error analysis system 366 can execute the second debug operation set 374 in accordance with the second script set to determine a second update to the second result. In some embodiments, if the second update to the second result indicates the need for a third debug operation set (e.g., the second result indicates that no errors were identified that would prevent execution of the third debug operation set in the hierarchy of debug operation sets), the error analysis system 366 can execute the third debug operation set in accordance with the third script set to determine a third result. The error analysis system 366 can then evaluate this third result similar to as described above with respect to the first result and/or the second result. Finally, based on the third result executing successfully, the error analysis system 366 can generate a completion report or an error report to indicate one or more aspects associated with the first portion or the second portion of the software programming workflow, providing detailed insight into the application's performance and error mitigation.

In some embodiments, based on the error analysis system 366 obtaining the first result by executing a first debug operation set 370 on the first script set, the second result, and so on, the error analysis system 366 can identify dependencies and downstream effects on subsequent script sets. The error analysis system 366 can then compile data generated by the error analysis system 366 and provide the data to the report generation system 368 to generate an error report detailing various aspects related to the execution of the first script set, second script set, and other related script sets. This error report can include information regarding aspects of the execution of the application such as indications of the application's performance, identified error conditions, dependencies affected by the errors, and potential areas for improvement within the script sets.

In some embodiments, the report generation system 368 can compile data from various debug operations and analysis performed by the error analysis system 366. This compiled data can then be formatted in accordance with an error report format. In some embodiments, the report generation system 368 can then transmit this error report to the client device 378, to allow for the report to be displayed on the display device 380. This display can provide software developers with detailed insight into the application's performance, highlighting identified error conditions, dependencies affected by the errors, and potential areas for improvement within the script sets. By presenting this information visually, developers can efficiently assess and address the root causes of errors, facilitating iterative debugging and optimization of the application.

In some embodiments, the report generation system 368 can identify one or more individuals to provide the report to. For example, the report generation system 368 can identify one or more individuals involved in portions of the software programming workflow associated with the application being evaluated by the error analysis system 366. In these examples, report generation system 368 can provide a user interface as described herein to cause a display device 380 of a client device controlled by the identified individuals to output the user interfaces described here in. In this way, the report generation system 368 can identify relevant individuals and cause user interfaces to be displayed on computing devices controlled by such individuals while foregoing the identification of other individuals that may not be relevant for a particular error, such as individuals associated with different portions of the software programming workflow that may or may not be affected by the one or more errors analyzed by the error analysis system 366.

Figure 4:
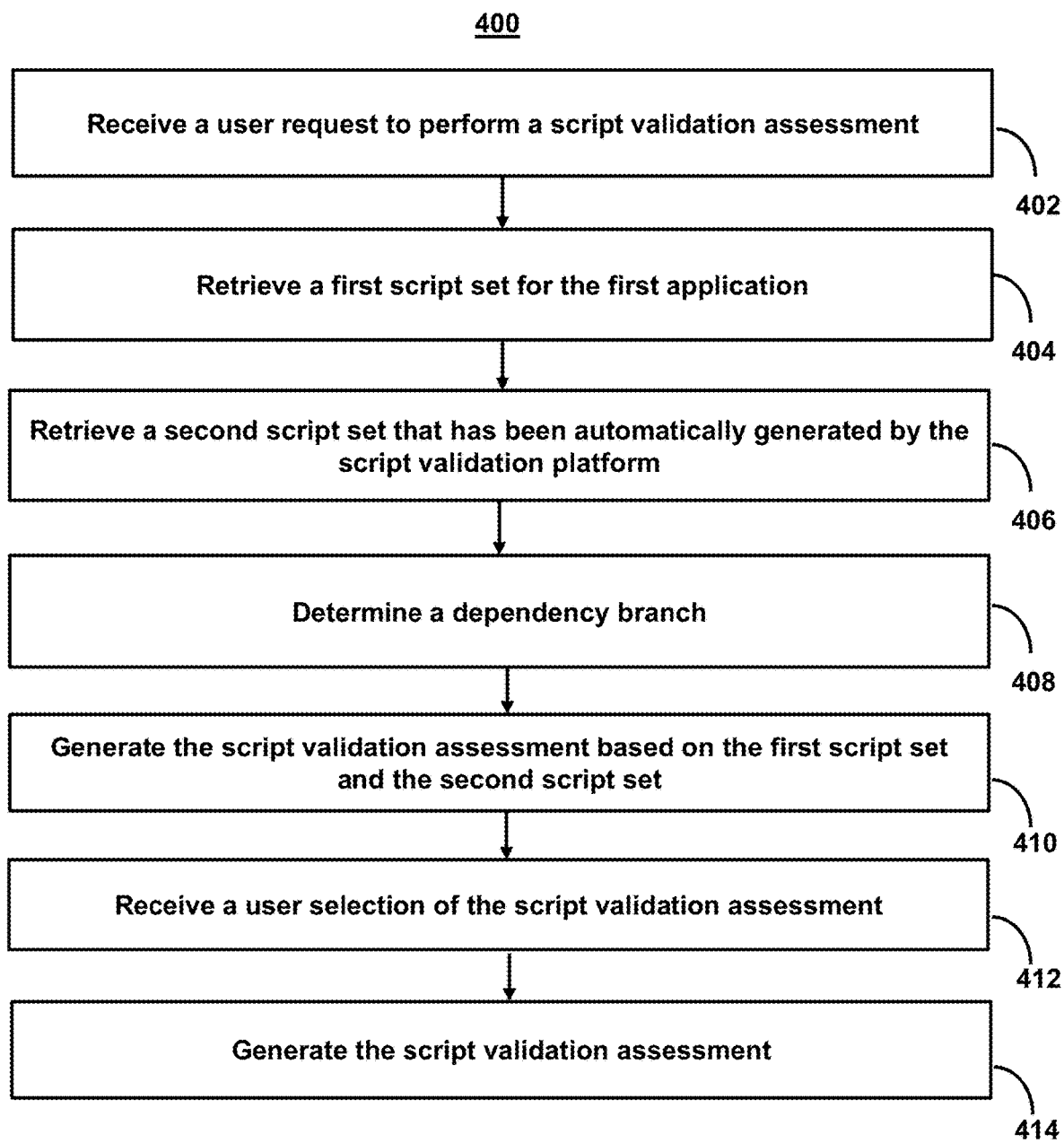
FIG. 4 shows a flowchart of the steps involved in integrating script development and script validation platforms based on detected dependency branches in script code, in accordance with one or more embodiments.
Figure 5:
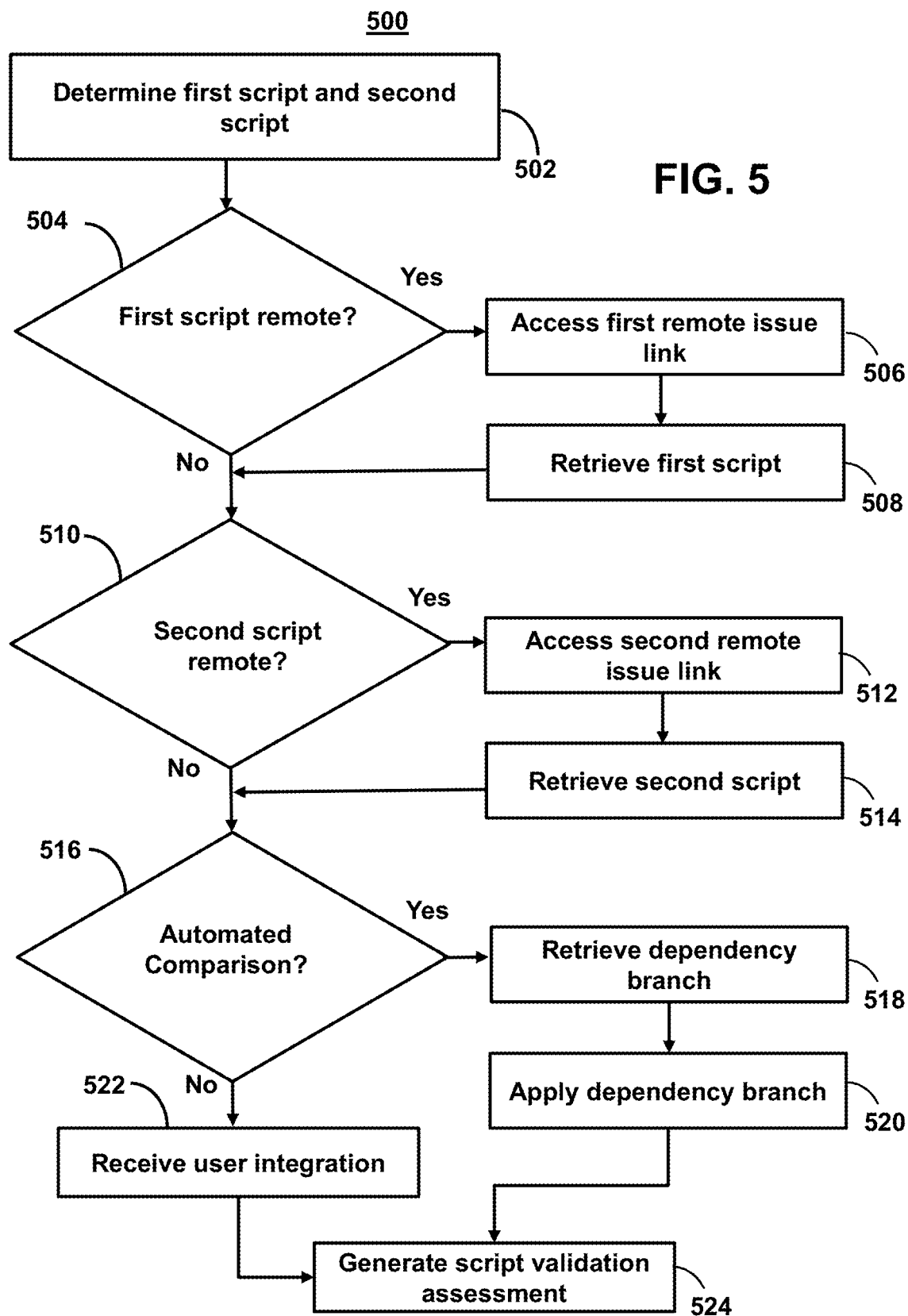
FIG. 5 shows a flowchart of the steps involved in generating a script validation assessment in a script validation platform, in accordance with one or more embodiments.

FIG. 4 shows a flowchart of the steps involved in integrating script development and script validation platforms based on detected dependency branches in script code. For example, process 400 may represent the steps taken by one or more devices, as shown in FIG. 2, when integrating script development and script validation platforms based on detected dependency branches in script code. In some embodiments, process 400 may be combined with one or more steps of process 500 (FIG. 5). For example, process 400 may relate to a script validation platform that may store native data corresponding to fields of script development and assessment data (e.g., viewable through a user interface (e.g., user interface 100 (FIG. 1A))).

At step 402, process 400 receives (e.g., using one or more components as described in FIG. 2) a user request to perform a script validation assessment. For example, the system may receive (e.g., via a user interface 100 (FIG. 1A)) a user request to perform a script validation assessment, on a first application, using a script validation platform. For example, the system may receive a user query to view information about the performance of an application using the script validation platform. For example, the system may receive a user query for the script validation platform, determine that a response to the user query is based on a dependency in a first workflow, retrieve native dependency data for the dependency, and generate for display the response based on the native dependency data.

At step 404, process 400 retrieves (e.g., using one or more components as described in FIG. 2) a first script set for the first application. For example, the system may retrieve a first script set for the first application, wherein the first script set defines a first workflow of script dependencies for the first application. In some embodiments, the first data script set may comprise a data organization, management, and storage format that enables efficient access and modification for the script set development control system. For example, the first data script set may include a collection of data values, data fields, the relationships among them, and the functions or operations that can be applied to the data.

At step 406, process 400 retrieves (e.g., using one or more components as described in FIG. 2) a second script set that has been automatically generated by the script validation platform. For example, the system may retrieve a second script set that has been automatically generated by the script validation platform, wherein the second script set defines a second workflow of script dependencies for inserting a dependency branch of the first workflow of script dependencies. In some embodiments, the second data script set may comprise a data organization, management, and storage format (e.g., as automatically selected by the system (e.g., using an artificial intelligence model)) that enables efficient access and modification that has been automatically generated by the script validation platform. For example, the second data script set may include a collection of data values, data fields, the relationships among them, and the functions or operations that can be applied to the data (e.g., as automatically selected by the system (e.g., using an artificial intelligence model)).

In some embodiments, the system may use one or more models to determine what dependency branches to test, modify, and/or what script attributes at those dependency branches to test and/or modify. For example, the system may receive an output of an artificial intelligence model, wherein the artificial intelligence model has been trained on historic performance level data that is labeled with script attributes at different dependency branches that resulted in respective performance levels. The system may select the dependency branch based on the output. In another example, the system may receive an output of an artificial intelligence model, wherein the artificial intelligence model has been trained on historic performance level data that is labeled with script attributes at different dependency branches that resulted in respective performance levels. The system may select a script attribute for the second script set based on the output.

At step 408, process 400 determines (e.g., using one or more components as described in FIG. 2) a dependency branch. For example, the system may determine, based on the second script set, the dependency branch of the first workflow of script dependencies for automatically generating the script validation assessment.

At step 410, process 400 generates (e.g., using one or more components as described in FIG. 2) the script validation assessment based on the first script set and the second script set. For example, the system may generate the script validation assessment based on the first script set and the second script set, wherein the script validation assessment indicates a performance level of the first application using the second script set. For example, the system may receive (e.g., via user interface 100 (FIG. 1A)) a user selection of the script validation assessment. Each script validation assessment may contain native data and also may link to other script sets. For example, the script validation assessment may be represented by a non-linear or linear data script set of nodes and edges.

In some embodiments, the system may determine a difference in a performance level of an application based on the use of different script sets. For example, the system may determine a difference in processing speed based on a first script set as compared to a second script set. By doing so, the system may determine which script sets optimize particular performance characteristics for an application. The system may express these differences using one or more quantitative (e.g., performance ratios, percentage differences, etc.) or qualitative measures (e.g., color coding, etc.). For example, the system may determine an initial performance level of the first application using the first script set. The system may determine the performance level of the first application using the second script set. The system may determine a difference between the initial performance level and the performance level. The system may determine the relationship based on the difference.

In some embodiments, the system may retrieve a script attribute from a script set. The script attribute may represent a characteristic of the script set, such as a data source used to perform a function at a dependency branch in a dependency workflow, a function performed at a dependency branch in a dependencies workflow, an algorithm performed at a dependency branch in a dependencies workflow, etc. For example, the system may determine a script attribute of the second script set, wherein the script attribute defines an alternative data source for serving the first workflow of script dependencies at the dependency branch. The system may execute the dependency branch using the script attribute. In another example, the system may determine a script attribute of the second script set, wherein the script attribute defines an alternative function for performing the first workflow of script dependencies at the dependency branch. The system may execute the dependency branch using the script attribute.

In some embodiments, the system may retrieve a script attribute from a script set. The script attribute may modify one or more portions of a workflow. For example, the script attribute may indicate a different order of dependencies in a workflow, a different weight or weighting factor to be applied to a result of a dependency, and/or other characteristics that may modify the workflow. For example, the system may determine a script attribute of the second script set, wherein the script attribute defines an alternative order for performing dependencies in the first workflow of script dependencies after the dependency branch. The system may execute the dependencies in the first workflow of script dependencies after the dependency branch in the alternative order.

For example, a dependency branch may represent a given function that is performed in the workflow. The result of that function may be used by subsequent functions (e.g., subsequent dependency branches in the workflow) as an input. The system may weight this input differently based on the script attribute. For example, the system may determine a script attribute of the second script set, wherein the script attribute defines an alternative weight for weighting a result of the dependency branch. The system may apply the alternative weight to the result.

In some embodiments, the script attribute may indicate a condition at which a dependency branch is taken (e.g., a function at the dependency branch is performed). For example, the script attribute may modify the condition and/or one or more characteristics of the condition. For example, the system may determine a script attribute of the second script set, wherein the script attribute defines an alternative condition for using the dependency branch of the first workflow of script dependencies. The system may determine that the alternative condition is met. The system may execute the dependency branch based on determining that the alternative condition is met.

In some embodiments, the script attribute may indicate a threshold frequency at which a dependency branch is taken. For example, the script attribute may modify the number of times a validation operation, system status check, and/or other test is run. For example, the dependency branch may comprise a branch of the workflow used to report results to the script validation platform. The script attribute may adjust this frequency in order to increase the number of results, the frequency at which updated results are received, and/or at which data is collected to determine a result. For example, the system may determine a script attribute of the second script set, wherein the script attribute defines a threshold frequency for using the dependency branch of the first workflow of script dependencies. The system may determine that a current frequency corresponds to the threshold frequency. The system may execute the dependency branch based on determining that the current frequency corresponds to the threshold frequency.

In some embodiments, generating the script validation assessment based on the first script set and the second script set may comprise retrieving a dependency branch of the first script set for generating the script validation assessment. For example, the first script set may include a workflow of script dependencies for validating a previously validated script set. The system may select the dependency branch for use in providing the assessment data below. In some embodiments, the dependency branch comprises selecting a script set attribute for determining the performance level.

In some embodiments, the script validation assessment may comprise a benchmark script set based on the dataset of the second script set. The script validation assessment may then compare the benchmark script set and the second script set. For example, the benchmark script set may comprise a script set generated by the system based on the second script set data input. The second data input may comprise the data set upon which the second script set was trained, tested, and/or validated. The benchmark script set may also share one or more script set attributes with the second script set. However, the benchmark script set may also include different script set attributes as a result of the dependency branch that is followed. For example, the benchmark script set may include a script set attribute (e.g., a specific data preparation, algorithm, architecture, etc.) that differs from the second script set.

The script validation assessment may then generate the benchmark script set with the one or more different attributes. The different attributes may then result in a different performance level, plot view, etc. The differences between the script sets may then be compared (e.g., as described in FIGS. 1-3).

In some embodiments, the performance level may indicate an amount of risk in a script set. For example, the performance level may indicate a level of uncertainty that the outputs of a statistical script set are acceptable with respect to the real data-generating process. That is, the level of performance may indicate the level of uncertainty that the outputs of a statistical script set have enough fidelity to the outputs of the data-generating process that the objectives of the script set may be achieved.

At step 412, process 400 receives (e.g., using one or more components as described in FIG. 2) a user selection of the script validation assessment. For example, the system may receive (e.g., via user interface 100 (FIG. 1A)) a user selection of the script validation assessment. For example, the system may receive (e.g., via user interface 100 (FIG. 1A)) a user selection of a script set attribute. For example, a script set attribute may be selected from several script set attributes. Each script set attribute may be a basic unit of a data script set, such as a link between one or more script sets. Each script validation assessment may contain data and may also link to other nodes. For example, the script validation assessment may be represented by a non-linear data script set of nodes and edges. In some embodiments, the system may implement links between nodes through pointers.

At step 414, process 400 generates (e.g., using one or more components as described in FIG. 2) for display, native data and assessment data. For example, the system may generate for display, on the user interface, native data, for the first script set and the second script set and assessment data that describes, in a human-readable format, a relationship between the native data for the first script set and the second script set. Additionally, or alternatively, the system may then receive a user modification to the source code of the second script set and store the modification to the source code.

For example, native data may comprise native data values or native data formats and may further comprise data that originates from and/or relates to a respective script set, the script validation platforms, and a respective plugin designed therefor. In some embodiments, native data may include data resulting from native code, which is code written specifically for the script set development control system, the script set, the script validation platforms, and/or a respective plugin designed therefor. For example, the native data for the first script set and the second script set may comprise respective raw data inputs and/or data outputs and plot views. In some embodiments, the system may determine a first performance characteristic of the first application using the first script set. The system may determine a second performance characteristic of the first application using the second script set. The system may determine a difference in the first performance characteristic and the second performance characteristic. The system may then determine the assessment data based on the difference.

For example, the assessment data may be presented in any format and/or representation of data that can be naturally read by humans (e.g., via a user interface such as user interface 100 (FIG. 1A)). In some embodiments, the assessment data may appear as a graphical representation of data. For example, the assessment data may comprise a graph or chart of the script validation assessment. In such cases, generating the graph may comprise determining a plurality of script sets for generating the script validation assessment and graphically representing a relationship of the plurality of script sets (e.g., as shown in FIG. 1A). In some embodiments, the relationship of the native data to the script validation assessment may comprise a graphical display describing a relationship of a result of a script set following a first workflow of script dependencies and a previously validated script set that follows a second workflow of script dependencies.

In some embodiments, the assessment data further comprises a recommendation for an adjustment to the second workflow of script dependencies. The system may recommend one or more adjustments to the second script set (e.g., the second workflow of script dependencies comprising the second script set) in order to reduce risk in the script set. For example, the system may generate a recommendation for an adjustment to the second script set data input or the second script set attribute. For example, the system may generate a recommendation of an alternative script setting technique (e.g., a different script set attribute) for use in the second script set. Additionally, or alternatively, the assessment data may further comprise an effect of the relationship on the performance level of the first application using the second script set. For example, the system may generate a script set attribute that describes an effect of the current script set.

In some embodiments, the system may allow a user to update and/or edit the assessment data. For example, the system may receive a user edit to the assessment data and then store the edited assessment data. The system may then generate for display the edited assessment data subsequently. For example, the system may allow users having a given authorization to edit assessment data subject to that authorization. In such cases, the assessment data may have read/write privileges. Upon generating the assessment data for display, the system may verify that a current user has one or more read/write privileges. Upon verifying the level of privileges, the system may grant the user access to edit the assessment data.

In some embodiments, the relationship of the native data to the script validation assessment comprises a graphical display comparing the first workflow of script dependencies to the second workflow of script dependencies. For example, as shown in user interface 100 (FIG. 1A), the system may generate a graph indicating a difference when using a first script set and a second script set.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed above could be used to perform one or more of the steps in FIG. 4.

FIG. 5 shows a flowchart of the steps involved in generating a script validation assessment in a script validation platform, in accordance with one or more embodiments. For example, process 500 may represent the steps taken by one or more devices, as shown in FIGS. 1-4. In some embodiments, process 500 may be combined with one or more steps of process 400 (FIG. 4).

At step 502, process 500 determines (e.g., using one or more components as described in FIG. 2) that the script validation assessment comprises a comparison of a first script set and the second script set. For example, in response to a user query (e.g., via user interface 100 (FIG. 1A)) to access a script validation assessment for a script validation platform, the system may determine the one or more script sets needed for comparison. To determine these, the system may input the user query into a database listing available script sets (and/or script set attributes and/or data types related to the script sets). The system may filter the available script sets to determine one or more script sets that may provide the script validation assessment.

At step 504, process 500 determines (e.g., using one or more components as described in FIG. 2) whether or not the first script set is located remotely. For example, if the system contains multiple project management servers, script sets, and data related to a single server. In some embodiments, the system may read in and build a merged workflow (e.g., a cross-server workflow) from remote issue links. This merged workflow may comprise a comparison and/or integration of multiple script sets for use in generating the script validation assessment. If process 500 determines that the first script set is located remotely, process 500 proceeds to step 506. If process 500 determines that the first script set is not located remotely, process 500 proceeds to step 510.

At step 506, process 500 accesses (e.g., using one or more components as described in FIG. 2) a first remote issue link. For example, the first remote issue link may be an identifier that uniquely identifies a remote application and/or a remote object within a remote system housing the first script set.

At step 508, process 500 retrieves (e.g., using one or more components as described in FIG. 2) the first script set. For example, in response to receiving the user request to access the script validation assessment, the system may determine that the script validation assessment comprises the first script set. In response to determining that the script validation assessment comprises the first script set, the system may access the first remote issue link to a first server housing the first script set. Through the first remote issue link, the system may retrieve (e.g., download, stream, and/or otherwise access through one or more API or database functions) the first script set.

At step 510, process 500 determines (e.g., using one or more components as described in FIG. 2) whether or not the second script set is located remotely. For example, similar to the first script set, the system may determine if the second script set is available locally or remotely. If process 500 determines that the second script set is located remotely, process 500 proceeds to step 512. If process 500 determines that the second script set is not located remotely, process 500 proceeds to step 516.

At step 512, process 500 accesses (e.g., using one or more components as described in FIG. 2) a second remote issue link. For example, the second remote issue link may be an identifier that uniquely identifies a second remote application and/or a second remote object within a second remote system housing the second script set. It should be noted that in some embodiments, the first and second script sets may be located in the same remote server. Furthermore, in some embodiments, the remote server may be a component of process 400 (FIG. 4).

At step 514, process 500 retrieves (e.g., using one or more components as described in FIG. 2) the second script set. For example, in response to receiving the user request to access the script validation assessment, the system may determine that the script validation assessment comprises the second script set. In response to determining that the script validation assessment comprises the second script set, the system may access the second remote issue link to a second server housing the second script set. Through the second remote issue link, the system may retrieve (e.g., download, stream, and/or otherwise access through one or more API or database functions) the second script set.

At step 516, process 500 determines (e.g., using one or more components as described in FIG. 2) whether or not the first and second script sets are automatically compared to generate the script validation assessment. For example, in some embodiments, script set automation may be used to reduce manual effort in maintaining items and running script set assessments. In such cases, the system may retrieve rules and/or determine dependency branches in hierarchies of dependencies supported by a script validation platform (or script set plugins). Exemplary dependencies may include pulling requests for script set data inputs and the script set attributes (e.g., which may pull algorithms and data sets specific to a determined script set) and "Add sub-dependencies" (e.g., which may pull in all sub-dependencies and/or automatically execute sub-dependencies for a script set). If process 500 determines that the first and second script sets are automatically compared to generate the script validation assessment, process 500 proceeds to step 518. If process 500 determines that the first and second script sets are not automatically compared to generate the script validation assessment, process 500 proceeds to step 522.

At step 518, process 500 retrieves (e.g., using one or more components as described in FIG. 2) a dependency branch. In some embodiments, the system may retrieve a standard dependency branch. Alternatively, the system may retrieve a custom dependency branch. For example, the system may select a dependency branch from a plurality of available dependency branches based on a type of one or more script sets. For example, the system may determine a first script set attribute for the script validation assessment. The system may then determine a second script set attribute that has been automatically generated by the script validation platform. The system may then determine a dependency branch for automatically generating the script validation assessment based on the second script set. For example, using the data inputs and script set attributes, the system may re-validate the second script set using the workflow of script dependencies in the first script set.

At step 520, process 500 applies (e.g., using one or more components as described in FIG. 2) a dependency branch. For example, the system may automatically generate the script validation assessment based on applying the dependency branch selected in step 518.

At step 522, process 500 receives (e.g., using one or more components as described in FIG. 2) user integration. For example, the system may receive user inputs (e.g., via user interface 100 (FIG. 1A)) by selecting a specific dependency (e.g., algorithm, comparison approach, etc.) that is used by the first script set. Alternatively, or additionally, the system may receive user inputs selecting a dependency branch for comparing one or more script sets and/or one or more portions of a script set.

At step 524, process 500 generates (e.g., using one or more components as described in FIG. 2) a script validation assessment. For example, the system may generate for display the script validation assessment in a user interface. In some embodiments, generating the script validation assessment may be an iterative process. For example, the system may generate a script set graph for the script validation assessment. The system may then determine script validation assessments (e.g., between the first and second script sets) based on the dependency branch selected in step 518 or based on the manual integration performed by a user in step 522.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

Figure 6:
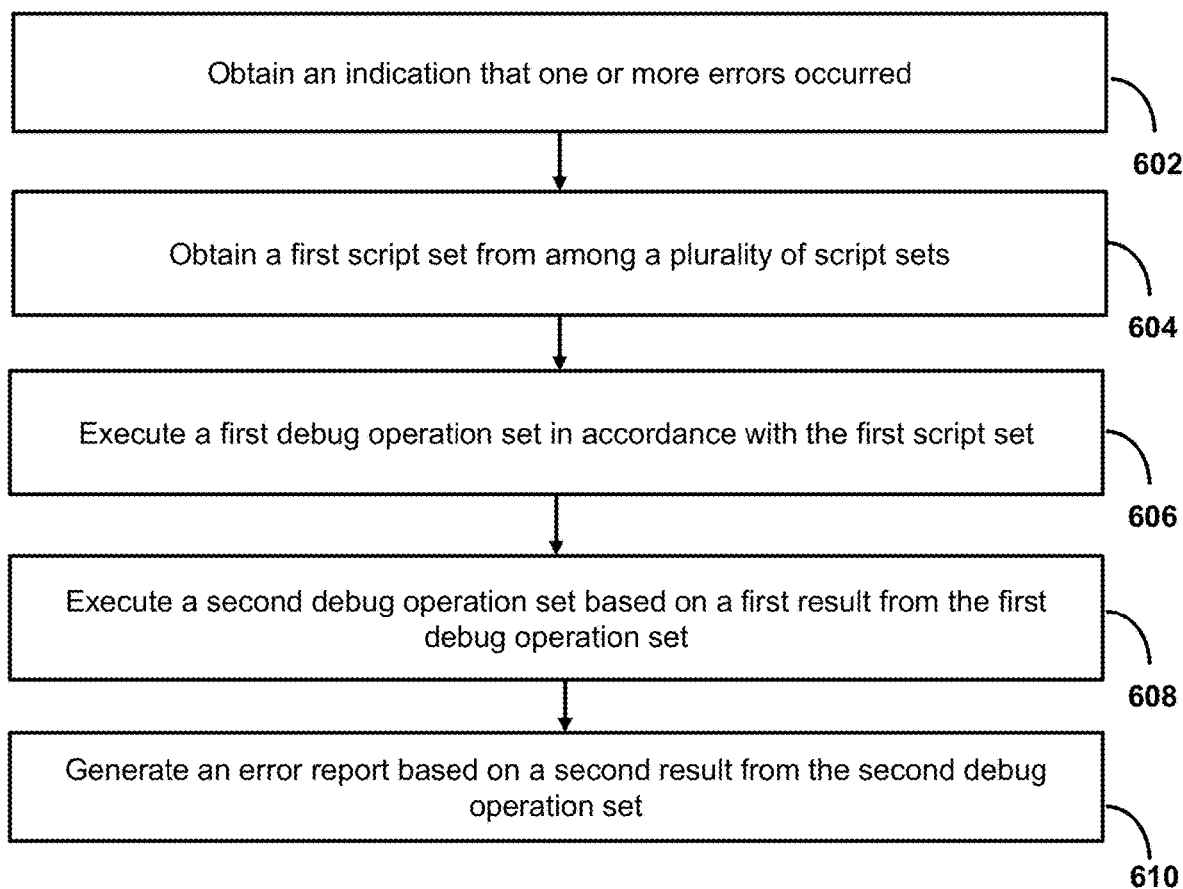
FIG. 6 shows a flowchart of the steps involved in updating a software application to test the application, in accordance with one or more embodiments.

FIG. 6 shows a flowchart of the steps involved in updating a software application to test the application, in accordance with one or more embodiments. For example, process 600 may represent the steps taken by one or more devices, as shown in FIGS. 1-4. In some embodiments, process 600 may be combined with one or more steps of process 400 (FIG. 4) and/or process 500 (FIG. 5).

At step 602, process 600 obtains (e.g., using one or more components as described in FIG. 2) an indication that one or more errors occurred. For example, in response to a user query (e.g., via user interface 100 (FIG. 1A)) to obtain a listing of errors that occurred during development or execution of an application on a single device or by devices in a distributed computing environment, the system may obtain the indication that one or more errors occurred. In another example, in response to execution of one or more operations by the system monitoring execution of the application, the system can obtain the indication that one or more errors occurred. In some examples, the indication that the one or more errors occurred can be associated with unexpected or unintended operation of one or more portions of an application. This can include, for example, the application crashing in response to receiving certain inputs, increased latencies associated with the execution of certain functions of the application, etc.

At step 604, process 600 obtains (e.g., using one or more components as described in FIG. 2 or FIG. 3C) a first script set from among a plurality of script sets. For example, the system may obtain a first script set from among a plurality of script sets corresponding to a first portion of a software programming workflow. The first portion of the software program workflow can likewise corresponds to one or more functions implemented by the application. In some examples, the system may obtain the first script set from a database that is remote from the system such as a code repository maintaining a plurality of script sets involved in the execution of the application. In other examples, the system may obtain the first script set from an internally maintained database that is associated with the system.

At step 606, process 600 executes (e.g., using one or more components as described in FIG. 2 or FIG. 3C) a first debug operation set 370 in accordance with the first script set. For example, the system can execute a first debug operation set 370 in accordance with the first scripts to analyze operation of a particular function within the application. This execution can occur during application development or at runtime. In some examples, execution of the first debug operation set 370 can allow the system to determine one or more intermediate results, a first result, etc., that represents aspects of the execution of the scripts included in the first script set. In some examples, the system can then determine one or more errors based on the execution of the first debug operation set 370 where the errors are localized to the first script set. In other examples, the system can then determine one or more errors were not identified based on the execution of the first script set, and the system can subsequently identify a second debug operation set 374 for a second script set indicated by the first result. This can allow the system to iteratively execute debug operation sets in accordance with the hierarchy established by the debug operation sets until a root cause of an error is identified.

At step 608, process 600 executes (e.g., using one or more components as described in FIG. 2 or FIG. 3C) a second debug operation set 374 based on a first result from the first debug operation set 370. For example, the system can execute the second debug operation set 374 in accordance with a second script set as described to determine a second result. The second result can again indicate that either no errors were identified during the execution of the second script set or that one or more errors were identified based on the aspects representing execution of the second script set. These errors can be indicative of incorrect and/or unintended performance of at least a portion of the application.

At step 610, process 600 generates (e.g., using one or more components as described in FIG. 2 or FIG. 3C) an error report based on a second result from the second debug operation set 374. For example, the system can generate an error report based on the second result from the second debug operation set 374. This can include an indication of one or more aspects that resulted in the error or errors that occurred during execution of the second script set in accordance with the second debug operation set 374. In some examples, the error report can also be based on the first result and any intermediate values generated during execution of the first debug operation set 370 or the second debug operation set 374. In some examples, the system can generate a user interface that indicates the aspects of the operation of the application when executing the first debug operation set 370 and/or for the second debug operation set 374. Once generated, the system can provide data that is associated with the user interface to cause a display device 380 to output the user interface thereon.

The present techniques will be better understood with reference to the following enumerated embodiments:

1. A method for integrating script development and script validation platforms based on detected dependency branches in script code.
2. The method of any one of the preceding embodiments, the method comprising: receiving, via a user interface, a user request to perform a script validation assessment on a first application using a script validation platform; retrieving a first script set for the first application, wherein the first script set defines a first workflow of script dependencies for the first application; retrieving a second script set that has been automatically generated by the script validation platform, wherein the second script set defines a second workflow of script dependencies for inserting at a dependency branch of the first workflow of script dependencies; determining, based on the second script set, the dependency branch of the first workflow of script dependencies for automatically generating the script validation assessment; generating the script validation assessment based on the first script set and the second script set, wherein the script validation assessment indicates a performance level of the first application using the second script set; receiving, via the user interface, a user selection of the script validation assessment; and in response to the user selection of the script validation assessment, generating for display on the user interface native data for the first script set and the second script set; and assessment data that describes, in a human-readable format, a relationship between the native data for the first script set and the second script set.
3. The method of any one of the preceding embodiments, wherein generating the script validation assessment based on the first script set and the second script set further comprises: determining an initial performance level of the first application using the first script set; determining the performance level of the first application using the second script set; determining a difference between the initial performance level and the performance level; and determining the relationship based on the difference.
4. The method of any one of the preceding embodiments, wherein generating the script validation assessment based on the first script set and the second script set further comprises: determining a script attribute of the second script set, wherein the script attribute defines an alternative data source for serving the first workflow of script dependencies at the dependency branch; and executing the dependency branch using the script attribute.
5. The method of any one of the preceding embodiments, wherein generating the script validation assessment based on the first script set and the second script set further comprises: determining a script attribute of the second script set, wherein the script attribute defines an alternative function for performing the first workflow of script dependencies at the dependency branch; and executing the dependency branch using the script attribute.
6. The method of any one of the preceding embodiments, wherein generating the script validation assessment based on the first script set and the second script set further comprises: determining a script attribute of the second script set, wherein the script attribute defines an alternative order for performing dependencies in the first workflow of script dependencies after the dependency branch; and executing the dependencies in the first workflow of script dependencies after the dependency branch in the alternative order.
7. The method of any one of the preceding embodiments, wherein generating the script validation assessment based on the first script set and the second script set further comprises: determining a script attribute of the second script set, wherein the script attribute defines an alternative weight for weighting a result of the dependency branch; and applying the alternative weight to the result.
8. The method of any one of the preceding embodiments, wherein generating the script validation assessment based on the first script set and the second script set further comprises: determining a script attribute of the second script set, wherein the script attribute defines an alternative condition for using the dependency branch of the first workflow of script dependencies; determining that the alternative condition is met; and executing the dependency branch based on determining that the alternative condition is met.
9. The method of any one of the preceding embodiments, wherein generating the script validation assessment based on the first script set and the second script set further comprises: determining a script attribute of the second script set, wherein the script attribute defines a threshold frequency for using the dependency branch of the first workflow of script dependencies; determining that a current frequency corresponds to the threshold frequency; and executing the dependency branch based on determining that the current frequency corresponds to the threshold frequency.
10. The method of any one of the preceding embodiments, wherein retrieving the second script set that has been automatically generated by the script validation platform further comprises: receiving an output of an artificial intelligence model, wherein the artificial intelligence model has been trained on historic performance level data that is labeled with script attributes at different dependency branches that resulted is respective performance levels; and selecting the dependency branch based on the output.

11. The method of any one of the preceding embodiments, wherein retrieving the second script set that has been automatically generated by the script validation platform further comprises: receiving an output of an artificial intelligence model, wherein the artificial intelligence model has been trained on historic performance level data that is labeled with script attributes at different dependency branches that resulted in respective performance levels; and selecting a script attribute for the second script set based on the output.

12. The method of any one of the preceding embodiments, further comprising: in response to receiving the user request, determining that the script validation assessment comprises the second script set; and in response to determining that the script validation assessment comprises the second script set, accessing a first remote issue link to a first server housing the first script set; and a second remote issue link to a second server housing the first script set.

13. The method of any one of the preceding embodiments, further comprising: receiving a user modification to the source code of the second script set; and storing the modification to the source code.

14. The method of any one of the preceding embodiments, wherein generating for display the native data for the first script set and the second script set further comprises: determining a first performance characteristic of the first application using the first script set; and determining a second performance characteristic of the first application using the second script set.

15. The method of any one of the preceding embodiments, wherein generating for display the assessment data that describes the relationship between the native data for the first script set and the second script set further comprises: determining a difference in the first performance characteristic and the second performance characteristic; and determining the assessment data based on the difference.

16. A method for updating a software application during testing of the software application to detect errors as a result of execution of portions of the software application that prevent downstream portions of the software application from being evaluated.

17. The method of any one of the preceding embodiments further comprising obtaining an indication that one or more errors occurred during execution of an application established by a plurality of script sets; in response to obtaining the indication, obtaining a first script set from among a plurality of script sets, where each script set of the plurality of script sets corresponds to a feature of the application; executing a first debug operation set comprising one or more debug operations in accordance with the first script set to determine a first result; in response to determining the first result is associated with an indication of a second debug operation set, executing the second debug operation set in accordance with a second script set to determine a second result; and generating an error report based on the second result to indicate one or more aspects associated with a first portion or a second portion of a software programming workflow corresponding to the application.

18. The method of any one of the preceding embodiments, further comprising: determining the second result based on a first state of the first script set, the second result indicating that at least a portion of the first script set is not complete, wherein generating the error report comprises: generating the error report based on the first state of the first script set to indicate a first aspect indicating that the first script set is not complete.

19. The method of any one of the preceding embodiments, further comprising: in response to determining that at least a portion of the first script set is not complete, executing a script validation assessment to determine one or more downstream scripts that are affected by the first state of the first script set; and determining one or more pseudocode scripts based on the one or more downstream scripts.

20. The method of any one of the preceding embodiments, further comprising: determining the second result based on a first state of the first script set, the second result indicating that at least a portion of the first script set is not complete; and providing at least a portion of the error report to an artificial neural network to cause the artificial neural network to generate an output in accordance with the first state of the first script, the output comprising an indication of one or more pseudocode scripts to be implemented by one or more downstream systems.

21. The method of any one of the preceding embodiments, further comprising: in response to obtaining the output of the artificial neural network, determining one or more locations associated with the one or more pseudocode scripts; obtaining the one or more pseudocode scripts based on the one or more locations; and reconfiguring the application based on the one or more pseudocode scripts.

22. The method of any one of the preceding embodiments, further comprising: in response to obtaining the output of the artificial neural network, obtaining one or more script outlines for one or more pseudocode scripts; generating the one or more pseudocode scripts based on the one or more script outlines; and reconfiguring the application based on the one or more pseudocode scripts.

23. The method of any one of the preceding embodiments, wherein the artificial neural network comprises a first artificial neural network, wherein generating the one or more pseudocode scripts comprises: providing the one or more script outlines to a second artificial neural network to cause the second artificial neural network to generate an output comprising the one or more pseudocode scripts generated in accordance with the one or more script outlines.

24. The method of any one of the preceding embodiments, further comprising: in response to reconfiguring the application based on the error report, executing the first debug operation set comprising one or more debug operations in accordance with the first script set to determine a first update to the first result; in response to determining the first update to the first result is associated with the indication of a second debug operation set, executing the second debug operation set in accordance with the second script set to determine a second update to the second result; in response to determining the second update to the second result is associated with the indication of a third debug operation set, executing the third debug operation set in accordance with the third script set to determine a third result; and generating a completion report or an error report based on the third result to indicate one or more aspects associated with the first portion or the second portion of the software programming workflow.

25. The method of any one of the preceding embodiments, further comprising: determining the second result based on a first state of the first script set, the second result indicating that an intermediate output generated in accordance with the first script set is incompatible with the second script set, wherein generating the error report comprises: generating the error report based on the first state of the first script set to indicate a first aspect indicating that the intermediate output is incompatible with the second script set.

26. The method of any one of the preceding embodiments, further comprising: comparing the first aspect to one or more predetermined aspects associated with intermediate outputs that are incompatible with portions of the application; determining at least a partial match between the first aspect and a predetermined aspect; and reconfiguring the application based on the predetermined aspect.

27. The method of any one of the preceding embodiments, further comprising: obtaining predetermined pseudocode scripts associated with a third portion of the software programming workflow; updating at least a portion of the first script set based on the predetermined pseudocode scripts; and in response to updating the first script set, updating the application.

28. The method of any one of the preceding embodiments, further comprising: obtaining predetermined pseudocode scripts associated with a second application developed in accordance with a second software programming workflow; updating at least a portion of the first script set based on the predetermined pseudocode scripts; and in response to updating the first script set, updating the application.

29. The method of any one of the preceding embodiments, further comprising: determining a dependency involving the first portion and the second portion of the software programming workflow; determining one or more pseudocode scripts based on the dependency involving the first portion and the second portion of the software programming workflow, and updating the application based on the one or more pseudocode scripts to execute the second portion of the software programing workflow based on outputs generated in accordance with the one or more pseudocode scripts.

30. The method of any one of the preceding embodiments, further comprising: providing at least a portion of the error report to an artificial neural network to cause the artificial neural network to generate an output in accordance with a first state of the first script, the output comprising an indication of one or more pseudocode scripts to be implemented by one or more downstream systems and one or more updates to the first debug operation set or the second debug operation set; updating the application based on the indication of the one or more pseudocode scripts; updating the first debug operation set or the second debug operation set based on implementation of the one or more pseudocode scripts; and evaluating performance of the application based on updating the first debug operation set or the second debug operation set.

31. The method of any one of the preceding embodiments, further comprising: determining a format associated with the first result; determining a mismatch between the format associated with the first result and an expected format for the first result; and updating the first script set based on the mismatch.

32. A tangible, non-transitory, machine-readable medium storing instructions that, when executed by a data processing apparatus, cause the data processing apparatus to perform operations comprising those of any of embodiments 1-31.

33. A system comprising one or more processors; and memory-storing instructions that, when executed by the processors, cause the processors to effectuate operations comprising those of any of embodiments 1-31.

34. A system comprising means for performing any of embodiments 1-31.

What is claimed is:

1. A system for updating a software application during testing of the software application to detect errors as a result of execution of portions of the software application that prevent downstream portions of the software application from being evaluated, the system comprising:

one or more processors;

a non-transitory, computer readable medium comprising instructions that when executed by the one or more processors cause operations comprising:

obtaining an indication that one or more errors occurred during execution of an application established by a plurality of script sets, the one or more errors indicating unexpected operation of one or more portions of the application;

in response to obtaining the indication, obtaining a first script set from among the plurality of script sets, where each script set of the plurality of script sets corresponds to a feature of the application;

executing a first debug operation set comprising one or more first debug operations in accordance with the first script set to determine a first result;

in response to determining the first result is associated with an indication of a second debug operation set, executing the second debug operation set comprising one or more second debug operations in accordance with a second script set to determine a second result, the second result indicating incorrect performance of a portion of the application; and generating an error report based on the second result to indicate one or more aspects associated with a first portion or a second portion of a software programming workflow corresponding to the application, the error report indicating that the second portion of the software programming workflow cannot be evaluated based on errors associated with the first portion of the software programming workflow.

2. A method, comprising:

obtaining an indication that one or more errors occurred during execution of an application established by a plurality of script sets;

in response to obtaining the indication, obtaining a first script set from among a plurality of script sets, where each script set of the plurality of script sets corresponds to a feature of the application;

executing a first debug operation set comprising one or more debug operations in accordance with the first script set to determine a first result;

in response to determining the first result is associated with an indication of a second debug operation set, executing the second debug operation set in accordance with a second script set to determine a second result based on a first state of the first script set, wherein the second result indicates that at least a portion of the first script set is not complete; and generating an error report based on the second result to indicate one or more aspects associated with a first portion or a second portion of a software programming workflow corresponding to the application, wherein the error report is based on the first state of the first script set to indicate a first aspect indicating that the first script set is not complete.

3. The method of claim 2, further comprising:

in response to determining that at least a portion of the first script set is not complete, executing a script validation assessment to determine one or more downstream scripts that are affected by the first state of the first script set; and determining one or more pseudocode scripts based on the one or more downstream scripts.

4. The method of claim 2, further comprising:

determining the second result based on a first state of the first script set, the second result indicating that at least a portion of the first script set is not complete; and providing at least a portion of the error report to an artificial neural network to cause the artificial neural network to generate an output in accordance with the first state of the first script, the output comprising an indication of one or more pseudocode scripts to be implemented by one or more downstream systems.

5. The method of claim 4, further comprising:

in response to obtaining the output of the artificial neural network, determining one or more locations associated with the one or more pseudocode scripts;

obtaining the one or more pseudocode scripts based on the one or more locations; and reconfiguring the application based on the one or more pseudocode scripts.

6. The method of claim 4, further comprising:

in response to obtaining the output of the artificial neural network, obtaining one or more script outlines for one or more pseudocode scripts;

generating the one or more pseudocode scripts based on the one or more script outlines; and reconfiguring the application based on the one or more pseudocode scripts.

7. The method of claim 6, wherein the artificial neural network comprises a first artificial neural network, wherein generating the one or more pseudocode scripts comprises:

providing the one or more script outlines to a second artificial neural network to cause the second artificial neural network to generate an output comprising the one or more pseudocode scripts generated in accordance with the one or more script outlines.

8. The method of claim 4, further comprising:

determining a format associated with the first result;

determining a mismatch between the format associated with the first result and an expected format for the first result; and updating the first script set based on the mismatch.

9. The method of claim 2, further comprising:

in response to reconfiguring the application based on the error report, executing the first debug operation set comprising one or more debug operations in accordance with the first script set to determine a first update to the first result;

in response to determining the first update to the first result is associated with the indication of the second debug operation set, executing the second debug operation set in accordance with the second script set to determine a second update to the second result;

in response to determining the second update to the second result is associated with the indication of a third debug operation set, executing the third debug operation set in accordance with the third script set to determine a third result; and generating a completion report or an error report based on the third result to indicate one or more aspects associated with the first portion or the second portion of the software programming workflow.

10. The method of claim 2, further comprising:

determining the second result based on a first state of the first script set, the second result indicating that an intermediate output generated in accordance with the first script set is incompatible with the second script set, wherein generating the error report comprises:

generating the error report based on the first state of the first script set to indicate the first aspect indicating that the intermediate output is incompatible with the second script set.

11. The method of claim 10, further comprising:

comparing the first aspect to one or more predetermined aspects associated with intermediate outputs that are incompatible with portions of the application;

determining at least a partial match between the first aspect and a predetermined aspect; and reconfiguring the application based on the predetermined aspect.

12. The method of claim 11, further comprising:

obtaining predetermined pseudocode scripts associated with a third portion of the software programming workflow;

updating at least a portion of the first script set based on the predetermined pseudocode scripts; and in response to updating the first script set, updating the application.

13. The method of claim 11, further comprising:

obtaining predetermined pseudocode scripts associated with a second application developed in accordance with a second software programming workflow;

updating at least a portion of the first script set based on the predetermined pseudocode scripts; and in response to updating the first script set, updating the application.

14. The method of claim 2, further comprising:

determining a dependency involving the first portion and the second portion of the software programming workflow;

determining one or more pseudocode scripts based on the dependency involving the first portion and the second portion of the software programming workflow, and updating the application based on the one or more pseudocode scripts to execute the second portion of the software programming workflow based on outputs generated in accordance with the one or more pseudocode scripts.

15. The method of claim 2, further comprising:

providing the portion of the error report to an artificial neural network to cause the artificial neural network to generate an output in accordance with the first state of the first script, the output comprising the indication of one or more pseudocode scripts to be implemented by one or more downstream systems and one or more updates to the first debug operation set or the second debug operation set;

updating the application based on the indication of the one or more pseudocode scripts;

updating the first debug operation set or the second debug operation set based on implementation of the one or more pseudocode scripts; and evaluating performance of the application based on updating the first debug operation set or the second debug operation set.

16. One or more non-transitory, computer-readable mediums storing instructions thereon that, when executed by one or more processors, cause the one or more processors to:

obtain an indication that one or more errors occurred during execution of an application established by a plurality of script sets;

in response to obtaining the indication, obtain a first script set from among the plurality of script sets, where each script set of the plurality of script sets corresponds to a feature of the application;

execute a first debug operation set comprising one or more debug operations in accordance with the first script set to determine a first result;

in response to determining the first result is associated with an indication of a second debug operation set, executing the second debug operation set in accordance with a second script set to determine a second result based on a first state of the first script set, wherein the second result indicates that an intermediate output generated in accordance with the first script set is incompatible with the second script set; and generating an error report based on the second result to indicate one or more aspects associated with a first portion or a second portion of a software programming workflow corresponding to the application, wherein the error report indicates a first aspect indicating that the intermediate output is incompatible with the second script set.

17. The one or more non-transitory, computer-readable mediums of claim 16, wherein the instructions further cause the one or more processors to:

determine the second result based on a first state of the first script set, the second result indicating that at least a portion of the first script set is not complete, wherein the instructions that cause the one or more processors to generate the error report cause the one or more processors to:

generate the error report based on the first state of the first script set to indicate the first aspect indicating that the first script set is not complete.

18. The one or more non-transitory, computer-readable mediums of claim 17, wherein the instructions further cause the one or more processors to:

in response to determining that at least a portion of the first script set is not complete, execute a script validation assessment to determine one or more downstream scripts that are affected by the first state of the first script set; and determine one or more pseudocode scripts based on the one or more downstream scripts.

19. The one or more non-transitory, computer-readable mediums of claim 16, wherein the instructions further cause the one or more processors to:

determine the second result based on a first state of the first script set, the second result indicating that at least a portion of the first script set is not complete; and provide at least a portion of the error report to an artificial neural network to cause the artificial neural network to generate an output in accordance with the first state of the first script, the output comprising an indication of one or more pseudocode scripts to be implemented by one or more downstream systems.

20. The one or more non-transitory, computer-readable mediums of claim 16, wherein the instructions further cause the one or more processors to:

determine a dependency involving the first portion and the second portion of the software programming workflow;

determine one or more pseudocode scripts based on the dependency involving the first portion and the second portion of the software programming workflow, and update the application based on the one or more pseudocode scripts to execute the second portion of the software programming workflow based on outputs generated in accordance with the one or more pseudocode scripts.

* * * * *